United States Patent
Amikura et al.

(10) Patent No.: US 10,788,356 B2
(45) Date of Patent: Sep. 29, 2020

(54) METHOD OF INSPECTING GAS SUPPLY SYSTEM, METHOD OF CALIBRATING FLOW CONTROLLER, AND METHOD OF CALIBRATING SECONDARY REFERENCE DEVICE

(71) Applicant: TOKYO ELECTRON LIMITED, Tokyo (JP)

(72) Inventors: Norihiko Amikura, Miyagi (JP); Risako Miyoshi, Miyagi (JP)

(73) Assignee: TOKYO ELECTRON LIMITED, Tokyo (JP)

( * ) Notice: Subject to any disclaimer, the term of this patent is extended or adjusted under 35 U.S.C. 154(b) by 499 days.

(21) Appl. No.: 15/702,824

(22) Filed: Sep. 13, 2017

(65) Prior Publication Data
US 2018/0073911 A1    Mar. 15, 2018

(30) Foreign Application Priority Data
Sep. 15, 2016   (JP) ................................ 2016-180581

(51) Int. Cl.
| | | |
|---|---|---|
| G01F 25/00 | (2006.01) | |
| G01F 13/00 | (2006.01) | |
| G01F 22/02 | (2006.01) | |
| G01F 1/34 | (2006.01) | |
| G01F 1/696 | (2006.01) | |

(52) U.S. Cl.
CPC .......... G01F 25/0092 (2013.01); G01F 13/00 (2013.01); G01F 1/34 (2013.01); G01F 1/696 (2013.01); G01F 22/02 (2013.01)

(58) Field of Classification Search
CPC ...... G01F 25/0092; G01F 13/00; G01F 22/02; G01F 1/696; G01F 1/34; G05B 2219/24065; G05B 23/0213
See application file for complete search history.

(56) References Cited

U.S. PATENT DOCUMENTS

2013/0186471 A1* 7/2013 Nagase .................... G01F 1/34 137/2
2018/0188700 A1* 7/2018 Penley ............... G01F 25/0053

FOREIGN PATENT DOCUMENTS

| JP | S54-085062 A | 7/1979 |
|---|---|---|
| JP | H06-160152 A | 6/1994 |
| JP | 2011-064707 A | 3/2011 |
| JP | 2012-032983 A | 2/2012 |

* cited by examiner

Primary Examiner — Xin Y Zhong
(74) Attorney, Agent, or Firm — Studebaker & Brackett PC

(57) ABSTRACT

A method according to an aspect includes a first step of connecting a reference device to the other end of a connecting pipe, a second step of supplying a gas from one flow controller into piping, a third step of acquiring measured values of a first pressure gauge and a first thermometer, a fourth step of supplying a portion of the gas in piping into a tank, a fifth step of acquiring measured values of the first pressure gauge and the first thermometer or measured values of a second pressure gauge and a second thermometer, and a sixth step of using a Boyle-Charles' law to calculate a volume of the piping on the basis of the measured values acquired in the third step, the measured values acquired in the fifth step, and a volume of a closed space including a space in the tank when the third valve is closed.

5 Claims, 13 Drawing Sheets

METHOD OF INSPECTING GAS SUPPLY SYSTEM, METHOD OF CALIBRATING FLOW CONTROLLER, AND METHOD OF CALIBRATING SECONDARY REFERENCE DEVICE

CROSS-REFERENCE TO RELATED APPLICATIONS

This application is based on and claims the benefit of priority from Japanese Patent Application No. 2016-180581 filed on Sep. 15, 2016, the entire contents of which are incorporated herein by reference.

FIELD

An exemplary embodiment of the present disclosure relates to a method of inspecting a gas supply system, a method of calibrating a flow controller, and a method of calibrating a secondary reference device.

BACKGROUND

In the manufacturing of electronic devices or the like, substrate processing is performed using a substrate processing apparatus. Some substrate processing apparatuses include a gas supply system that supplies a gas of which the flow rate is controlled by a flow controller, into a processing container.

The actual output flow rate of the flow controller sometimes slightly changes with the lapse of operating time. In this case, deviation occurs between the set flow rate and the actual output flow rate of the flow controller. In addition, even the flow controllers which are set to have the same set flow rate may have different actual output flow rates when the makers thereof are different from each other. In a case where the output flow rate of the flow controller is different from its set flow rate, a processing result different from an intended processing result is obtained when a substrate is treated using the substrate processing apparatus.

In order to avoid such a situation, there is known a method of inspecting an output flow rate of a flow controller using a build-up method of measuring a flow rate of a gas using the temperature, pressure and volume of the gas. For example, Japanese Unexamined Patent Publication No. 2012-32983 discloses a method of measuring a flow rate of a gas using a build-up tank having a known inner volume, as a first method. In addition, Japanese Unexamined Patent Publication No. 2012-32983 discloses a method of calculating a volume in piping of a gas supply system using the set flow rate of a flow controller, and measuring a flow rate of a gas using a volume in the piping, as a second method.

SUMMARY

In an aspect, a method of inspecting a gas supply system for supplying a gas into a processing container of a substrate processing apparatus is provided. The gas supply system comprises a plurality of flow controllers respectively connected to a plurality of gas sources, a piping including a main pipe having an end on a downstream side connected to the processing container, a plurality of branch pipes branching from the main pipe and respectively connected to the plurality of flow controllers, and a connecting pipe having one end connected to a midway position of the main pipe or a midway position of one branch pipe out of the plurality of branch pipes and the other end, a plurality of first valves respectively provided between the plurality of branch pipes and the plurality of flow controllers, a second valve provided between the end of the main pipe on the downstream side and the processing container, a third valve provided to the other end of the connecting pipe, a first pressure gauge configured to measure a pressure in the piping, and a first thermometer configured to measure a temperature in the piping.

The method according to the aspect comprises: a first step of connecting a reference device to the other end of the connecting pipe through the third valve, the reference device comprising a tank, a second pressure gauge configured to measure a pressure in the tank, and a second thermometer configured to measure a temperature in the tank; a second step of supplying a gas from one flow controller out of the plurality of flow controllers, connected to one first valve out of the plurality of first valves, into the piping, in a state where the one first valve is opened and the other first valve except the one first valve out of the plurality of first valves, the second valve and the third valve are closed; a third step of acquiring measured values of the first pressure gauge and the first thermometer, after the second step and after the one first valve is closed; a fourth step of supplying a portion of the gas in the piping into the tank by opening the third valve, after the third step; a fifth step of acquiring measured values of the first pressure gauge and the first thermometer or measured values of the second pressure gauge and the second thermometer, after the fourth step; and a sixth step of using a Boyle-Charles' law to calculate a volume of the piping on the basis of the measured values acquired in the third step, the measured values acquired in the fifth step, and a volume of a closed space including a space in the tank when the third valve is closed.

In another aspect, a method of calibrating a flow controller using the method of inspecting a gas supply system is provided. In this method, an output flow rate of the one flow controller is calibrated on the basis of the flow rate Q of a gas calculated in the eleventh step and the constant set flow rate. According to this method, it is possible to calibrate the flow controller with high accuracy by using the flow rate Q of a gas calculated with high accuracy.

In another aspect, a calibrator comprises a flow controller connected to a gas source, a primary reference device including a first tank, a first pressure gauge configured to measure a pressure in the first tank, and a first thermometer configured to measure a temperature in the first tank, a first pipe that connects the flow controller and the first tank, a second pipe, having one end and the other end, the one end of the second pipe being connected to the first tank, a first valve provided on a path of the first pipe, and a second valve provided on a path of the second pipe.

A method of calibrating a secondary reference device according to another aspect includes a first step of detachably connecting the secondary reference device to the other end of the second pipe, the secondary reference device comprising a second tank, a second pressure gauge configured to measure a pressure in the second tank, and a second thermometer configured to measure a temperature in the second tank; a second step of supplying a gas from the flow controller into the first tank and the second tank, in a state where the first valve and the second valve are opened; a third step of calibrating the second pressure gauge and the second thermometer, on the basis of measured values of the first pressure gauge and the first thermometer, after the second step and after the first valve is closed; a fourth step of supplying a gas from the flow controller into the first tank, in a state where the first valve is opened and the second valve is closed, after the third step; a fifth step of acquiring measured values of the first pressure gauge and the first thermometer, after the fourth step and after the first valve is closed; a sixth step of supplying a portion of the gas in the first tank into the second tank by opening the second valve, after the fifth step; a seventh step of acquiring measured values of the first pressure gauge and the first thermometer or measured values of the second pressure gauge and the second thermometer, after the sixth step; and an eighth step of using a Boyle-Charles' law to calculate a volume of a closed space including a space in the second tank when the second valve is closed, on the basis of the measured values acquired in the fifth step, the measured values acquired in the seventh step, and a volume of a closed space including a space in the first tank when the first valve and the second valve are closed.

The foregoing summary is illustrative only and is not intended to be in any way limiting. In addition to the illustrative aspects, exemplary embodiments, and features described above, further aspects, exemplary embodiments, and features will become apparent by reference to the drawings and the following detailed description.

BRIEF DESCRIPTION OF THE DRAWINGS

FIG. 5 is a diagram schematically illustrating a state of each valve of the calibrator after the execution of step S22a.

FIG. 6 is a diagram schematically illustrating a state of each valve of the calibrator after the execution of step S23a.

FIG. 7 is a diagram schematically illustrating a state of each valve of the calibrator after the execution of step S24a.

FIG. 8 is a diagram schematically illustrating a state of each valve of the calibrator after the execution of step S25a.

FIG. 10 is a diagram schematically illustrating a state of each valve of the gas supply system after the execution of step S3a.

FIG. 11 is a diagram schematically illustrating a state of each valve of the gas supply system after the execution of step S4a.

FIG. 13 is a diagram schematically illustrating a state of each valve of the gas supply system after the execution of step S5a.

DETAILED DESCRIPTION

Figure 1:
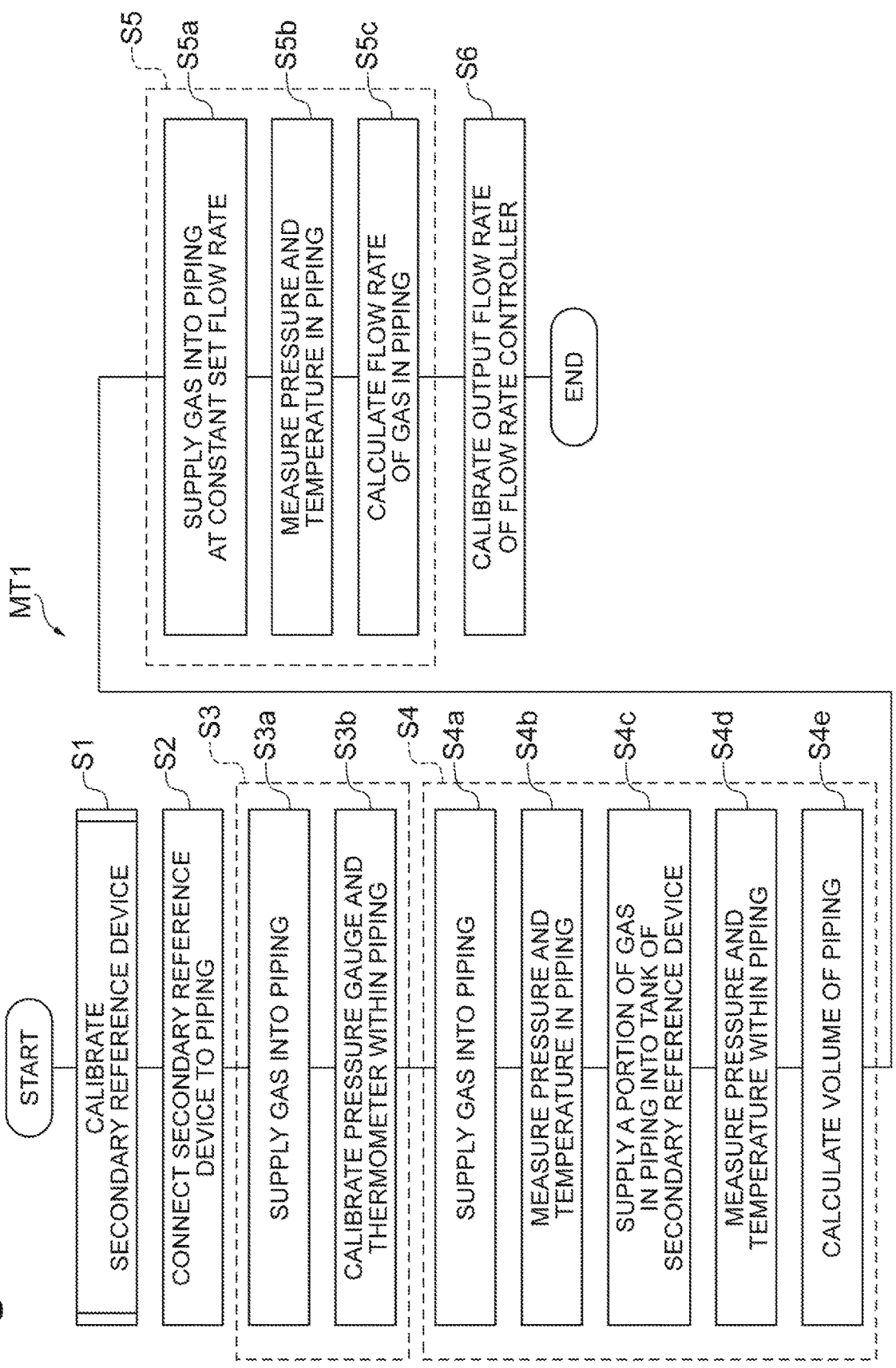
FIG. 1 is a flow diagram illustrating a method of inspecting a gas supply system of an exemplary embodiment.

In the following detailed description, reference is made to the accompanying drawings, which form a part hereof. The exemplary embodiments described in the detailed description, drawing, and claims are not meant to be limiting. Other exemplary embodiments may be utilized, and other changes may be made, without departing from the spirit or scope of the subject matter presented here.

In gas piping of a gas supply system, its volume sometimes slightly changes due to deposits being attached to the inner wall of the gas piping, or the like. A change in the volume in the gas piping may cause a change in the responsiveness of a gas of the gas supply system to a processing container. However, in the first method described above, since the volume in the piping of the gas supply system is not measured, it is not possible to inspect a change in the volume in the piping. Therefore, the volume in the piping changes with the lapse of operating time. As a result, when the responsiveness of a gas changes, it is difficult to specify the cause. In addition, in the second method described above, since the volume in the piping is calculated using the flow rate value of the flow controller to be calibrated, the accuracy of calculation of the volume is low, and as a result, the reliability of the gas flow rate measured using the volume is also low.

Thus, in the present technical field, a method of inspecting a gas supply system with high accuracy is required.

In an aspect, a method of inspecting a gas supply system for supplying a gas into a processing container of a substrate processing apparatus is provided. The gas supply system comprises a plurality of flow controllers respectively connected to a plurality of gas sources, a piping including a main pipe having an end on a downstream side connected to the processing container, a plurality of branch pipes branching from the main pipe and respectively connected to the plurality of flow controllers, and a connecting pipe having one end connected to a midway position of the main pipe or a midway position of one branch pipe out of the plurality of branch pipes and the other end, a plurality of first valves respectively provided between the plurality of branch pipes and the plurality of flow controllers, a second valve provided between the end of the main pipe on the downstream side and the processing container, a third valve provided to the other end of the connecting pipe, a first pressure gauge configured to measure a pressure in the piping, and a first thermometer configured to measure a temperature in the piping.

The method according to the aspect includes: a first step of connecting a reference device to the other end of the connecting pipe through the third valve, the reference device comprising a tank, a second pressure gauge configured to measure a pressure in the tank, and a second thermometer configured to measure a temperature in the tank; a second step of supplying a gas from one flow controller out of the plurality of flow controllers, connected to one first valve out of the plurality of first valves, into the piping, in a state where the one first valve is opened and the other first valve except the one first valve out of the plurality of first valves, the second valve and the third valve are closed; a third step of acquiring measured values of the first pressure gauge and the first thermometer, after the second step and after the one first valve is closed; a fourth step of supplying a portion of the gas in the piping into the tank by opening the third valve, after the third step; a fifth step of acquiring measured values of the first pressure gauge and the first thermometer or measured values of the second pressure gauge and the second thermometer, after the fourth step; and a sixth step of using a Boyle-Charles' law to calculate a volume of the piping on the basis of the measured values acquired in the third step, the measured values acquired in the fifth step, and a volume of a closed space including a space in the tank when the third valve is closed.

The measured values acquired in the third step are pressure and temperature in the piping when the gas from the flow controller is filled into the piping, and the measured values acquired in the fifth step are pressure and temperature in the piping after the third valve is opened, and the inside of the piping and the pressure of the tank of the reference device are set to be in an equilibrium state. Here, when the pressure of the gas is set to P, the temperature thereof is set to T, and the volume thereof is set to V, PV/T has a constant property (Boyle-Charles' law). whereby using this property, it is possible to calculate the volume of the piping on the basis of the measured values in the third step, the measured values in the fifth step, and the volume of a closed space including a space in the tank when the third valve is closed. In this calculation method, since the volume of the piping can be calculated without using the flow rate value of the flow controller having low reliability, it is possible to calculate the volume of the piping with high accuracy.

In an exemplary embodiment, the method may further include, after the first step and before the second step: a seventh step of supplying a gas from the one flow controller into the piping, in a state where the one first valve and the third valve are opened, and the other first valve and the second valve are closed; and an eighth step of calibrating the first pressure gauge and the first thermometer, on the basis of the measured values of the second pressure gauge and the second thermometer, after the seventh step and after the one first valve is closed.

In the method according to the exemplary embodiment, since the first pressure gauge and the first thermometer in the piping are calibrated on the basis of the measured values the second pressure gauge and the second thermometer of the reference device before the volume of the piping is calculated, the measured values of the first pressure gauge and the first thermometer can be brought close to true values. Thus, it is possible to inspect the gas supply system with a higher accuracy.

In an exemplary embodiment, the method may further include a ninth step of continuously supplying a gas from the one flow controller into the piping at a constant set flow rate, in a state where the one first valve is opened, and the other first valve, the second valve and the third valve are closed, after the sixth step; a tenth step of measuring pressure and temperature in the piping at a first point in time and pressure and temperature in the piping at a second point in time after the first point in time, in a state where a gas is continuously supplied into the piping at the constant set flow rate, and calculating a pressure increasing rate in the piping from the first point in time to the second point in time; and an eleventh step of calculating a flow rate Q of a gas in the piping from the following Expression (1-1), $$Q=(\Delta P/\Delta t)\cdot V_p \cdot C/T \quad (1\text{-}1)$$

wherein $\Delta P/\Delta t$ is the pressure increasing rate, $V_p$ is a sum of a volume of the piping and a volume of a flow channel communicating with the piping when the one first valve is opened, and the other first valve, the second valve and the third valve are closed, T is a temperature in the piping, and C is a constant.

In the method according to the exemplary embodiment, it is possible to obtain the flow rate of a gas with high accuracy by using the volume in the piping measured in the sixth step.

In another aspect, a method of calibrating a flow controller using the method of inspecting a gas supply system is provided. In this method, an output flow rate of the one flow controller is calibrated on the basis of the flow rate Q of a gas calculated in the eleventh step and the constant set flow rate. According to this method, it is possible to calibrate the flow controller with high accuracy by using the flow rate Q of a gas calculated with high accuracy.

In another aspect, a calibrator includes a flow controller connected to a gas source, a primary reference device provided with a first tank, a first pressure gauge configured to measure a pressure in the first tank, and a first thermometer configured to measure a temperature in the first tank, a first pipe that connects the flow controller and the first tank, a second pipe, having one end and the other end, the one end of the second pipe being connected to the first tank, a first valve provided on a path of the first pipe, and a second valve provided on a path of the second pipe.

A method of calibrating a secondary reference device according to another aspect includes a first step of detachably connecting the secondary reference device to the other end of the second pipe, the secondary reference device comprising a second tank, a second pressure gauge configured to measure a pressure in the second tank, and a second thermometer configured to measure a temperature in the second tank; a second step of supplying a gas from the flow controller into the first tank and the second tank, in a state where the first valve and the second valve are opened; a third step of calibrating the second pressure gauge and the second thermometer, on the basis of measured values of the first pressure gauge and the first thermometer, after the second step and after the first valve is closed; a fourth step of supplying a gas from the flow controller into the first tank, in a state where the first valve is opened and the second valve is closed, after the third step; a fifth step of acquiring measured values of the first pressure gauge and the first thermometer, after the fourth step and after the first valve is closed; a sixth step of supplying a portion of the gas in the first tank into the second tank by opening the second valve, after the fifth step; a seventh step of acquiring measured values of the first pressure gauge and the first thermometer or measured values of the second pressure gauge and the second thermometer, after the sixth step; and an eighth step of using a Boyle-Charles' law to calculate a volume of a closed space including a space in the second tank when the second valve is closed, on the basis of the measured values acquired in the fifth step, the measured values acquired in the seventh step, and a volume of a closed space including a space in the first tank when the first valve and the second valve are closed.

According to the above method, it is possible to calibrate the second pressure gauge and the second thermometer of the secondary reference device, and to calculate the volume of a closed space including a space in the second tank which is used in the inspection of the gas supply system. In addition, by using the above method, a plurality of secondary reference devices are connected to the calibrator in order, and thus it is possible to calibrate the plurality of secondary reference devices. Since the plurality of secondary reference devices calibrated in this manner are calibrated using the same calibrator, it is possible to provide a plurality of secondary reference devices having a small machine difference.

In an exemplary embodiment, the calibrator may include a reference device for collation comprising a third tank, a third pressure gauge configured to measure a pressure in the third tank, and a third thermometer configured to measure a temperature in the third tank, a third pipe connecting the first tank and the third tank, and a third valve provided on a path of the third pipe, the method further comprising, before the first step: a ninth step of supplying a gas from the flow controller into the first tank and the third tank, in a state where the first valve and the third valve are opened, and the second valve is closed; and a tenth step of calibrating the first pressure gauge and the first thermometer, on the basis of measured values of the third pressure gauge and the third thermometer, after the ninth step and after the first valve is closed.

In the above method, since the first pressure gauge and the first thermometer of the primary reference device are calibrated on the basis of the measured values of the third pressure gauge and the third thermometer of the reference device for collation, before the secondary reference device is calibrated, it is possible to calibrate the secondary reference device with higher accuracy on the basis of the calibrated primary reference device.

The method of calibrating a secondary reference device according to the exemplary embodiment may further include, after the tenth step and before the first step: an eleventh step of continuously supplying a gas from the flow controller into the first tank at a constant set flow rate, in a state where the first valve is opened, and the second valve and the third valve are closed; a twelfth step of measuring pressure and temperature in the first tank at a first point in time and pressure and temperature in the first tank at a second point in time after the first point in time, in a state where a gas is continuously supplied into the first tank at the constant set flow rate, and calculating a pressure increasing rate in the first tank from the first point in time to the second point in time; and a thirteenth step of calculating a volume V of a closed space including a space in the first tank when the first valve, the second valve and the third valve are closed, on the basis of the following Expression (1-2), $$V=Q\cdot T/\{(\Delta P/\Delta t)\cdot C\} \quad (1\text{-}2)$$

wherein $\Delta P/\Delta t$ is the pressure increasing rate, Q is the constant set flow rate, T is a temperature in the first tank, and C is a constant.

In an exemplary embodiment, the reference device connected to the other end of the connecting pipe in the first step may be a secondary reference device calibrated by using a calibrator. The calibrator may comprise: a second flow controller connected to a gas source, a primary reference device including a third tank, a third pressure gauge configured to measure a pressure in the third tank, and a third thermometer configured to measure a temperature in the third tank, a first pipe that connects the second flow controller and the third tank, a second pipe having one end and the other end, the one end of the second pipe being connected to the third tank, a fourth valve provided on a path of the first pipe, and a fifth valve provided on a path of the second pipe. In an exemplary embodiment, the method further comprises, before the first step: a twelveth step of detachably connecting the secondary reference device to the other end of the second pipe; a thirteenth step of supplying a gas from the second flow controller into the third tank of the primary reference device and the tank of the secondary reference device, in a state where the fourth valve and the fifth valve are opened; a fourteenth step of calibrating the second pressure gauge and the second thermometer, on the basis of measured values of the third pressure gauge and the third thermometer, after the thirteenth step and after the fourth valve is closed; a fifteenth step of supplying a gas from the second flow controller into the third tank of the primary reference device, in a state where the fourth valve is opened and the fifth valve is closed, after the fourteenth step; a sixteenth step of acquiring measured values of the third pressure gauge and the third thermometer, after the fifteenth step and after the fourth valve is closed; a seventeen step of supplying a portion of the gas in the third tank into the tank of the secondary reference device by opening the fifth valve, after the sixteenth step; a eighteenth step of acquiring measured values of the third pressure gauge and the third thermometer or measured values of the second pressure gauge and the second thermometer, after the seventeen step; and a nineteenth step of using a Boyle-Charles' law to calculate a volume of a closed space including a space in the tank of the secondary reference device when the fifth valve is closed, on the basis of the measured values acquired in the sixteenth step, the measured values acquired in the eighteenth step, and a volume of a closed space including a space in the third tank when the fourth valve and the fifth valve are closed. In this exemplary embodiment, it is possible to measure the volume in the piping of the gas supply system with high accuracy by using the volume of a closed space including a space in the tank of the secondary reference device calculated in the nineteenth step.

In an exemplary embodiment, the reference device connected to the other end of the connecting pipe in the first step may be a secondary reference device calibrated by using a calibrator. The calibrator may comprise: a second flow controller connected to a gas source, a primary reference device including a third tank, a third pressure gauge configured to measure a pressure in the third tank, and a third thermometer configured to measure a temperature in the third tank, a first pipe that connects the second flow controller and the third tank, a second pipe having one end and the other end, the one end of the second pipe being connected to the third tank, a fourth valve provided on a path of the first pipe, and a fifth valve provided on a path of the second pipe. In an exemplary embodiment, the method further comprises, before the first step: a twelveth step of detachably connecting the secondary reference device to the other end of the second pipe; a thirteenth step of supplying a gas from the second flow controller into the third tank of the primary reference device and the tank of the secondary reference device, in a state where the fourth valve and the fifth valve are opened; a fourteenth step of calibrating the second pressure gauge and the second thermometer, on the basis of measured values of the third pressure gauge and the third thermometer, after the thirteenth step and after the fourth valve is closed; a fifteenth step of supplying a gas from the second flow controller into the third tank of the primary reference device, in a state where the fourth valve is opened and the fifth valve is closed, after the fourteenth step; a sixteenth step of acquiring measured values of the third pressure gauge and the third thermometer, after the fifteenth step and after the fourth valve is closed; a seventeen step of supplying a portion of the gas in the third tank into the tank of the secondary reference device by opening the fifth valve, after the sixteenth step; a eighteenth step of acquiring measured values of the third pressure gauge and the third thermometer or measured values of the second pressure gauge and the second thermometer, after the seventeen step; and a nineteenth step of using a Boyle-Charles' law to calculate a volume of a closed space including a space in the tank of the secondary reference device when the fifth valve is closed, on the basis of the measured values acquired in the sixteenth step, the measured values acquired in the eighteenth step, and a volume of a closed space including a space in the third tank when the fourth valve and the fifth valve are closed. In this exemplary embodiment, it is possible to measure the output flow rate of the flow controller with high accuracy by using the volume of a closed space including a space in the tank of the secondary reference device calculated in the nineteenth step.

According to an aspect and various embodiments of the present disclosure, it is possible to inspect a gas supply system with high accuracy.

FIG. 1 is a flow diagram illustrating a method of inspecting a gas supply system of an exemplary embodiment. A method MT1 shown in FIG. 1 can be applied to, for example, a gas supply system 10 shown in FIG. 2.

Figure 2:
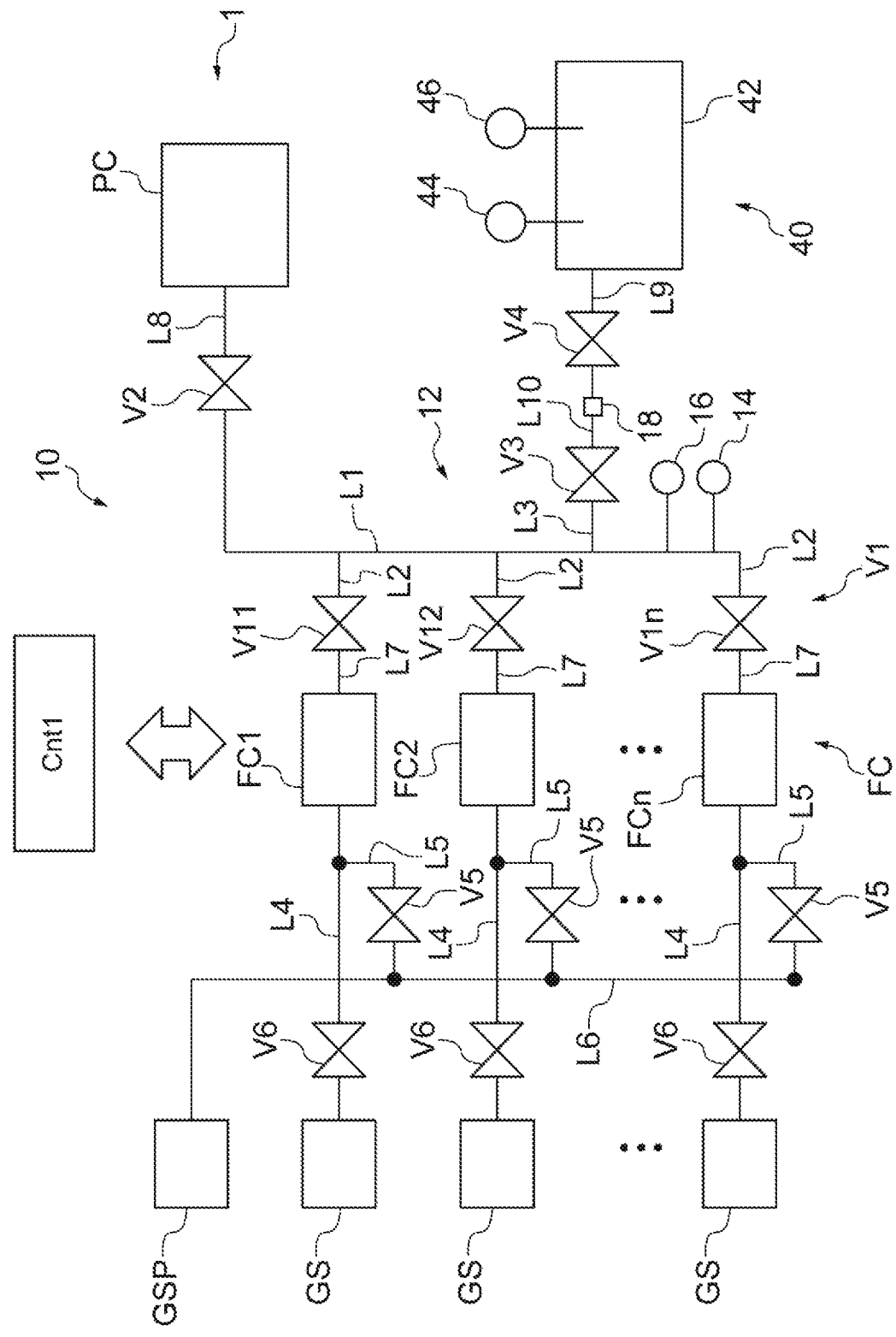
FIG. 2 is a diagram illustrating an example of the gas supply system.

As shown in FIG. 2, the gas supply system 10 includes n (n is a positive integer) flow controllers FC1, FC2, ..., FCn, piping 12, n valves (a plurality of first valves of the gas supply system) V11, V12, ..., V1n, a valve (second valve of the gas supply system) V2, and a valve (third valve of the gas supply system) V3. Hereinafter, in the case of not being required to be particularly distinguished from each other, the n flow controllers FC1, FC2, ..., FCn are called a plurality of flow controllers FC, and the n valves V11, V12, ..., V1n are called a plurality of valves V1.

Each of the plurality of flow controllers FC has a function of adjusting the flow rate of a gas from a gas source. One end of each of a plurality of pieces of piping L4 is connected to the input side of each of the plurality of flow controllers FC. The other end of each of the plurality of pieces of piping L4 is connected to each of a plurality of gas sources GS. A plurality of valves V6 are provided on the paths of the plurality of pieces of piping L4, respectively. A plurality of pieces of piping L5 are connected to positions between the plurality of flow controllers FC and the plurality of valves V6 in the plurality of pieces of piping L4, respectively. In addition, a plurality of valves V5 are provided on the paths of the plurality of pieces of piping L5, respectively. The plurality of pieces of piping L5 are merged into piping L6. The end of the piping L6 on the upstream side is connected to a gas source GSP of a purge gas such as a nitrogen gas ($N_2$).

In addition, one end of each of a plurality of pieces of piping L7 is connected to the output side of each of the plurality of flow controllers FC. The other end of each of the plurality of pieces of piping L7 is connected to a first port of each of the plurality of valves V1. In an exemplary embodiment shown in FIG. 2, the n valves V11, V12, ..., V1n are connected to the output sides of the flow controllers FC1, FC2, ..., FCn through the plurality of pieces of piping L7.

The piping 12 includes a main pipe L1, a plurality of branch pipes L2, and a connecting pipe L3. The end of the main pipe L1 on the downstream side is connected to a first port of the valve V2. One end of piping L8 is connected to a second port of the valve V2. The other end of the piping L8 is connected to a processing container PC of a substrate processing apparatus 1. That is, the end of the main pipe L1 on the downstream side is connected to the processing container PC through the valve V2 and the piping L8. The upstream side of the main pipe L1 is branched into the plurality of branch pipes L2. The plurality of branch pipes L2 are connected to second ports of the plurality of valves V1, respectively.

One end of the connecting pipe L3 is connected to the midway position of the main pipe L1. The other end of the connecting pipe L3 is connected to a first port of the valve V3. In an exemplary embodiment, one end of the connecting pipe L3 may be connected to the midway position of one branch pipe L2 out of the plurality of branch pipes L2. One end of piping L10 is connected to a second port of the valve V3. The other end of the piping L10 is provided with a joint 18. The joint 18 is configured to be capable of coupling piping L9 of a secondary reference device 40, described later, to the piping L10.

In addition, the gas supply system 10 includes a pressure gauge (first pressure gauge of the gas supply system) 14 that detects a pressure in the piping 12 and a thermometer (first thermometer of the gas supply system) 16 that detects a temperature in the piping 12. The pressure gauge 14 and the thermometer 16 are provided to the piping 12. Meanwhile, in the exemplary embodiment of FIG. 2, the pressure gauge 14 and the thermometer 16 are provided to the main pipe L1, but the pressure gauge 14 and the thermometer 16 may be provided to one branch pipe L2 out of the plurality of branch pipes L2 or the connecting pipe L3.

In addition, as shown in FIG. 2, the gas supply system 10 may further include a control unit Cnt1. The control unit Cnt1 is a control unit of the substrate processing apparatus 1, and is constituted by, for example, a computer apparatus or the like. The control unit Cnt1 controls each unit of the substrate processing apparatus 1 and each unit of the gas supply system 10, in accordance with a recipe stored in a storage apparatus for the purpose of substrate processing in the substrate processing apparatus 1. In addition, the control unit Cnt1 controls the valves of the gas supply system 10 in various embodiments of the method of inspecting the gas supply system. In addition, in various embodiments of the method, the control unit Cnt1 receives measured values of various types of pressure gauges and thermometers, and performs various types of arithmetic processing.

Reference is made to FIG. 1 again. In the method MT1, step S1 is first performed. In step S1, the secondary reference device 40 is calibrated. The secondary reference device 40 is a reference device which is detachably connected to the gas supply system 10 in order to inspect the gas supply system 10. Meanwhile, step S1 may be performed when the secondary reference device 40 is used for the first time or when a period which is set in advance from the previous calibration has elapsed, and is not necessarily performed whenever the method MT1 is executed.

Figure 3:
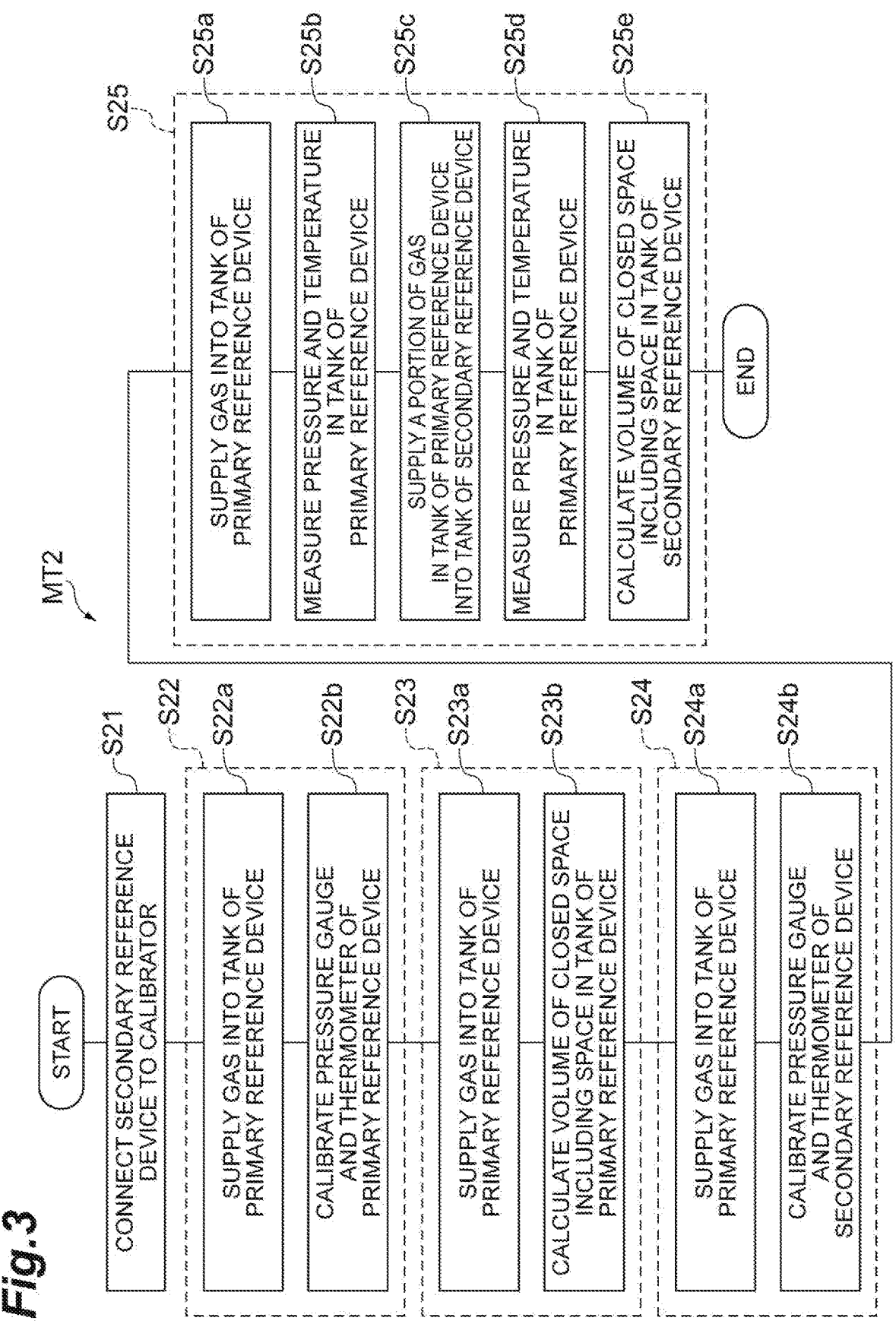
FIG. 3 is a flow diagram illustrating a method of calibrating a secondary reference device of an exemplary embodiment.

A method of calibrating the secondary reference device 40 of an exemplary embodiment will be described with reference to FIGS. 3 and 4. FIG. 3 is a flow diagram illustrating a method MT2 of calibrating the secondary reference device of an exemplary embodiment. In the method MT2 shown in FIG. 3, the secondary reference device 40 is calibrated using calibrator CA shown in FIG. 4.

Figure 4:
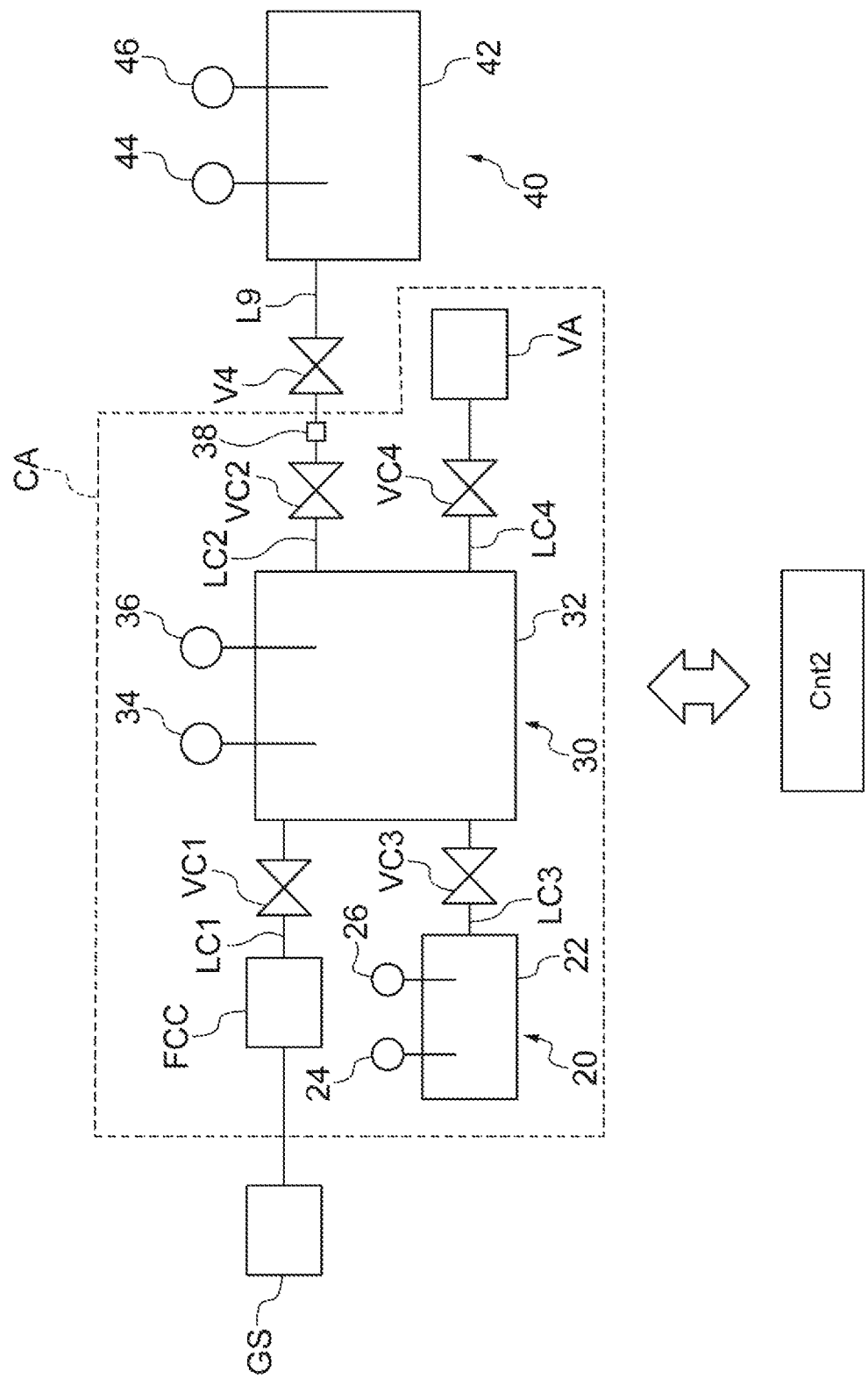
FIG. 4 is a diagram illustrating an example of a calibrator to which the secondary reference device is connected.

The calibrator CA shown in FIG. 4 includes a primary reference device 30, a flow controller (second flow controller) FCC, pipe (first pipe of the calibrator) LC1, pipe (second pipe of the calibrator) LC2, a valve (first valve or fourth valve of the calibrator) VC1, and a valve (second valve or fifth valve of the calibrator) VC2.

The primary reference device 30 includes a tank (first tank or third tank of the primary reference device) 32, a pressure gauge (first pressure gauge or third pressure gauge of the primary reference device) 34, and a thermometer (first thermometer or third thermometer of the primary reference device) 36. The pressure gauge 34 and the thermometer 36 is used for measuring a pressure and a temperature in the tank 32. The primary reference device 30 is used for calibrating the secondary reference device 40.

The input side of the flow controller FCC is connected to the gas source GS, and controls the flow rate of a gas from the gas source GS. The gas source GS is, for example, a gas source of a nitrogen gas ($N_2$). One end of the pipe LC1 is connected to the output side of the flow controller FCC. The other end of the pipe LC1 is connected to the tank 32. The valve VC1 is provided on the path of the pipe LC1.

In addition, one end of the pipe LC2 is connected to the tank 32. A joint 38 is provided to the other end of the pipe LC2. As described later, the joint 38 is configured to be capable of coupling the other end of the piping L9 of the secondary reference device 40, described later, to the other end of the pipe LC2. In addition, the valve VC2 is provided on the path of the pipe LC2.

The calibrator CA may further include a reference device for collation 20, pipe (third pipe) LC3, pipe LC4, a valve (third valve of the calibrator) VC3, a valve VC4, and an exhaust apparatus VA. The reference device for collation 20 includes a tank (third tank) 22, a pressure gauge (third pressure gauge) 24, and a thermometer (third thermometer) 26. The pressure gauge 24 and the thermometer 26 are used for measuring a pressure and a temperature in the tank 22. The reference device for collation 20 is, for example, a high-accuracy reference device which is provided by a maker of the flow controller FCC, and is used for calibrating the primary reference device 30.

One end of the pipe LC3 is connected to the tank 22, and the other end of the pipe LC3 is connected to the tank 32. The valve VC3 is provided on the path of the pipe LC3. In addition, one end of the pipe LC4 is connected to the tank 32, and the other end of the pipe LC4 is connected to the exhaust apparatus VA. The exhaust apparatus VA has a vacuum pump such as a turbo-molecular pump, and is configured to depressurize the inside of the tank 32. The valve VC4 is provided on the path of the pipe LC4.

In addition, the calibrator CA may further include a control unit Cnt2. The control unit Cnt2 is constituted by, for example, a computer apparatus or the like. The control unit Cnt2 controls the flow controller FCC and various types of valves of the calibrator CA, in accordance with a program stored in a storage apparatus. In addition, in various embodiments of the method, the control unit Cnt2 receives measured values of various types of pressure gauges and thermometers, and performs various types of arithmetic processing.

Reference is made to FIG. 3 again to describe the method MT2 of calibrating a secondary reference device of an exemplary embodiment. In this method MT2, step S21 is first performed. In step S21, the secondary reference device 40 is connected to the calibrator CA. As shown in FIG. 4, the secondary reference device 40 includes a tank (second tank) 42, a pressure gauge (second pressure gauge of the secondary reference device) 44, and a thermometer (second thermometer of the secondary reference device) 46. The pressure gauge 44 and the thermometer 46 are used for measuring a pressure and a temperature in the tank 42. In addition, the secondary reference device 40 may further include the piping L9 having one end thereof connected to the tank 42. A valve V4 is provided on the path of the piping L9. In step S21, for example, the other end of the piping L9 is connected to the joint 38, and thus the secondary reference device 40 is detachably connected to the pipe LC2 of the calibrator CA. Meanwhile, step S21 may be executed after step S22 described later, or after step S23 described later.

Next, in the method MT2, steps S22 and S23 are performed. In step S22, the pressure gauge 34 and the thermometer 36 of the primary reference device 30 are calibrated. In step S23, the volume of a closed space including a space in the tank 32 of the primary reference device 30 when the valve VC1, the valve VC2, the valve VC3 and the valve VC4 are closed is calculated. Meanwhile, steps S22 and S23 may be performed when the primary reference device 30 is used for the first time or when a period which is set in advance from the previous calibration has elapsed, and are not necessarily performed whenever the method MT2 is executed.

Figure 5:
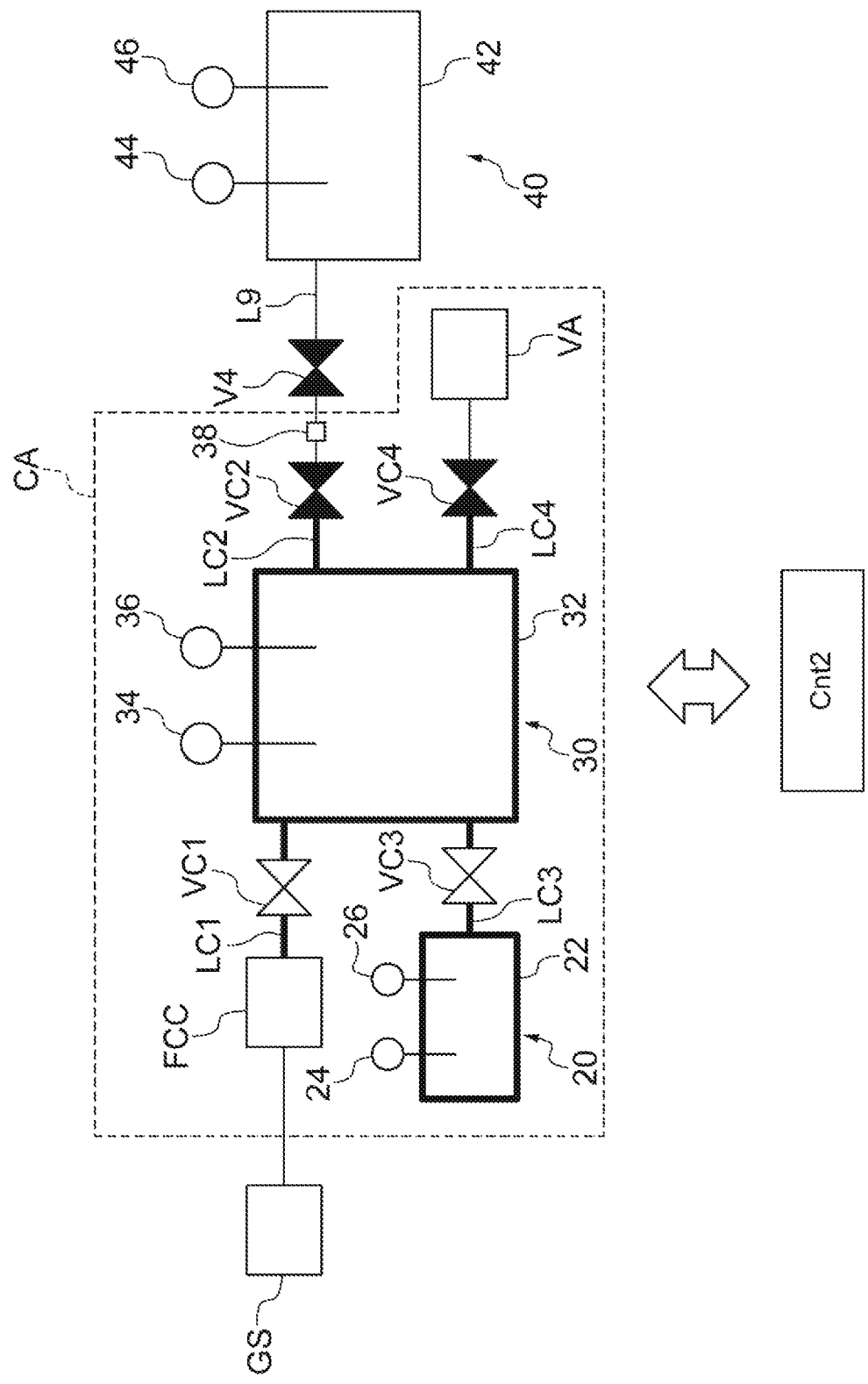

Step S22 includes step S22a and step S22b. In step S22, step S22a is first performed. In step S22a, a gas is supplied from the flow controller FCC to the tank 32 in a state where the valves VC1 and VC3 are opened, and the valves VC2, VC4 and V4 are closed. FIG. 5 is a diagram schematically illustrating a state of each valve of the calibrator CA after the execution of step S22a. In FIG. 5 and FIGS. 6 to 13 described later, graphic figures which are blackened among graphic figures indicating valves show closed valves, and graphic figures which are whitened among graphic figures indicating valves show opened valves. After the execution of step S22a, as shown by bold lines of FIG. 5, a gas is accumulated inside the tank 22, the tank 32, the pipe LC1, a portion of the pipe LC2 located between the valve VC2 and the tank 32, the pipe LC3, and a portion of the pipe LC4 located between the valve VC4 and the tank 32.

After the execution of step S22a, step S22b is performed. In step S22b, the valve VC1 is first closed, and thus the supply of a gas to the tank 32 is stopped. Next, after a gas in the tanks 22 and 32 is set to be in a stable state, the pressure gauge 34 and the thermometer 36 of the primary reference device 30 are calibrated on the basis of the measured values of the pressure gauge 24 and the thermometer 26 of the reference device for collation 20. This calibration is performed by adjusting the pressure gauge 34 and the thermometer 36 so that the measured values of the pressure gauge 34 and the thermometer 36 are coincident with the measured values of the pressure gauge 24 and the thermometer 26. Since the pressure gauge 24 and the thermometer 26 of the reference device for collation 20 are measuring instruments having high reliability, the pressure gauge 34 and the thermometer 36 are calibrated on the basis of the pressure gauge 24 and the thermometer 26, and thus the measured values of the pressure gauge 34 and the thermometer 36 can be brought close to true values. After the execution of step S22, the valve VC4 is opened, and thus the gas in the tanks 22 and 32 may be exhausted using the exhaust apparatus VA.

After the execution of step S22, step S23 is performed. As described above, in step S23, the volume of a closed space including a space in the tank 32 (hereinafter, simply called "the volume of a closed space including a space in the tank 32") of the primary reference device 30 when the valve VC1, the valve VC2, the valve VC3 and the valve VC4 are closed is calculated. The volume of a closed space including a space in the tank 32 is a total sum of the volume of the tank 32 when the valve VC1, the valve VC2, the valve VC3 and the valve VC4 are closed and the volume of a flow channel which is in communication with the tank 32. Specifically, in an exemplary embodiment shown in FIG. 4, the sum of the volume of the tank 32, a partial volume between the valve VC1 and the tank 32 out of the total volume of the pipe LC1, a partial volume between the valve VC2 and the tank 32 out of the total volume of the pipe LC2, a partial volume between the valve VC3 and the tank 32 out of the total volume the pipe LC3, and a partial volume between the valve VC4 and the tank 32 out of the total volume the pipe LC4 is set to the volume of a closed space including the tank 32.

Here, the number of molecules n of a gas supplied to the tank 32 is represented by the following Expression (1) from the Avogadro's law.

$$n = Q \cdot t / 22.4 \qquad (1)$$

(here, Q is the flow rate of the gas, and t is the time during which the gas is caused to flow)

In a case where Expression (1) is substituted into the state equation of an ideal gas shown in the following Expression (2), the following Expression (2) is modified like the following Expression (3).

$$P \cdot V = n \cdot R \cdot T \quad (2)$$

(here, P is the pressure of the gas, V is the volume of the gas, R is a constant, and T is the temperature of the gas)

$$P \cdot V = Q \cdot t \cdot R \cdot T / 22.4 \quad (3)$$

In a case where both sides of Expression (3) are differentiated by time t, and 22.4/R is set to constant C, the volume V of the gas is represented by the following Expression (1-2).

$$V = Q \cdot T / \{(\Delta P / \Delta t) \cdot C\} \quad (1\text{-}2)$$

In step S23, the volume of a closed space including a space in the tank 32 is calculated using Expression (1-2). Step S23 includes step S23a and step S23b. In step S23, step S23a is first performed.

Figure 6:
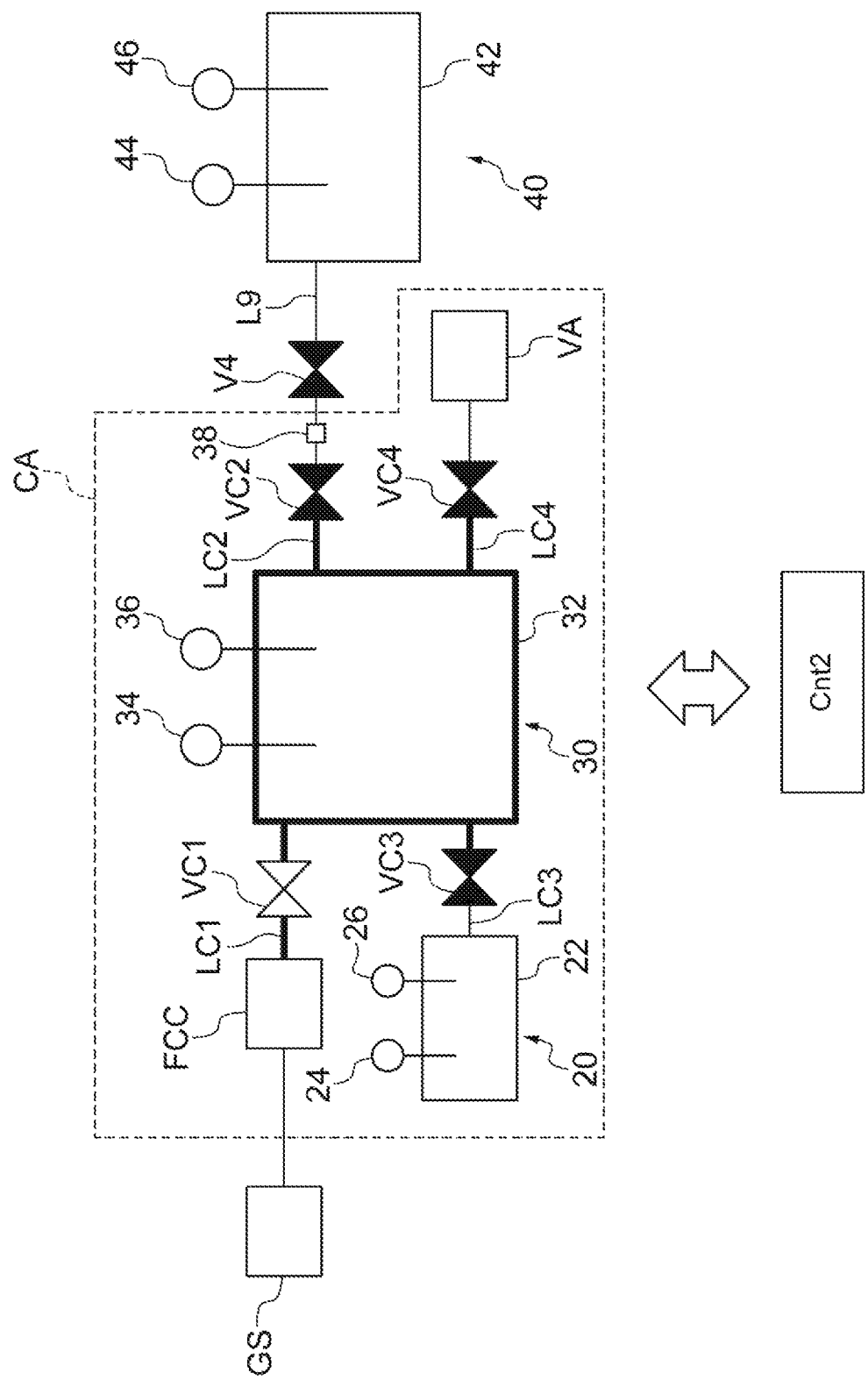

In step S23a, in a state where the valves VC1 and VC4 are opened, and the valves VC2, VC3 and V4 are closed, a gas is continuously supplied from the flow controller FCC to the tank 32 at a constant set flow rate. Thereafter, the valve VC4 is closed. FIG. 6 is a diagram schematically illustrating a state of each valve of the calibrator CA after the execution of step S23a. After the execution of step S23a, as shown by bold lines of FIG. 6, the gas from the flow controller FCC is accumulated inside the tank 32, the pipe LC1, a portion of the pipe LC2 located between the valve VC2 and the tank 32, a portion of the pipe LC3 located between the valve VC3 and the tank 32, and a portion of the pipe LC4 located between the valve VC4 and the tank 32.

After the execution of step S23a, step S23b is performed. In step S23b, in a state where a gas is continuously supplied from the flow controller FCC into the tank 32 at a constant set flow rate, the measured values of the pressure gauge 34 and the thermometer 36, that is, the pressure and temperature in the tank 32 are acquired. The measurement of the pressure and temperature in the tank 32 is performed at least twice while a gas is continuously supplied into the tank 32 at a constant set flow rate. In an exemplary embodiment, the first measurement is performed at a first point in time $t_1$ when the valve VC4 is closed, and the second measurement is performed at a second point in time $t_2$ after a time $\Delta t$ from the first point in time $t_1$. Next, a difference $\Delta P$ between a pressure value in the tank 32 measured at the first point in time $t_1$ and a pressure value in the tank 32 measured at the second point in time $t_2$ is divided by the time $\Delta t$ ($=t_2-t_1$) from the first point in time $t_1$ to the second point in time $t_2$, and thus the pressure increasing rate $\Delta P/\Delta t$ in the tank 32 with respect to the time $\Delta t$ is calculated. A constant set flow rate Q of the flow controller FCC, the pressure increasing rate $\Delta P/\Delta t$, and a temperature T in the tank 32 measured at the first point in time $t_1$ or the second point in time $t_2$ are substituted into Expression (1-2), and the volume V of the gas is calculated.

The volume V of the gas is set to a sum of the volume of the tank 32, the volume of the pipe LC1, a partial volume between the valve VC2 and the tank 32 out of the total volume of the pipe LC2, a partial volume between the valve VC3 and the tank 32 out of the total volume of the pipe LC3, and a partial volume between the valve VC4 and the tank 32 out of the total volume of the pipe LC4. In other words, the volume V of the gas is equivalent to a sum of the volume of a closed space including a space in the tank 32 and a partial volume between the flow controller FCC and the valve VC1 out of the total volume of the pipe LC1. Therefore, in an exemplary embodiment, a partial volume between the flow controller FCC and the valve VC1 out of the total volume of the pipe LC1 is subtracted from the volume V calculated by Expression (1-2), and thus the volume of a closed space including a space in the tank 32 is calculated. Meanwhile, a partial volume between the flow controller FCC and the valve VC1 out of the total volume of the pipe LC1 is a known value which is determined during the design of the calibrator CA. After the execution of step S23, the valve VC4 is opened again, and thus the gas in the tank 32 may be exhausted using the exhaust apparatus VA.

After the execution of step S23, step S24 is performed. In step S24, the pressure gauge 44 and the thermometer 46 of the secondary reference device 40 are calibrated. Step S24 includes step S24a and step S24b. In step S24, step S24a is first performed.

Figure 7:
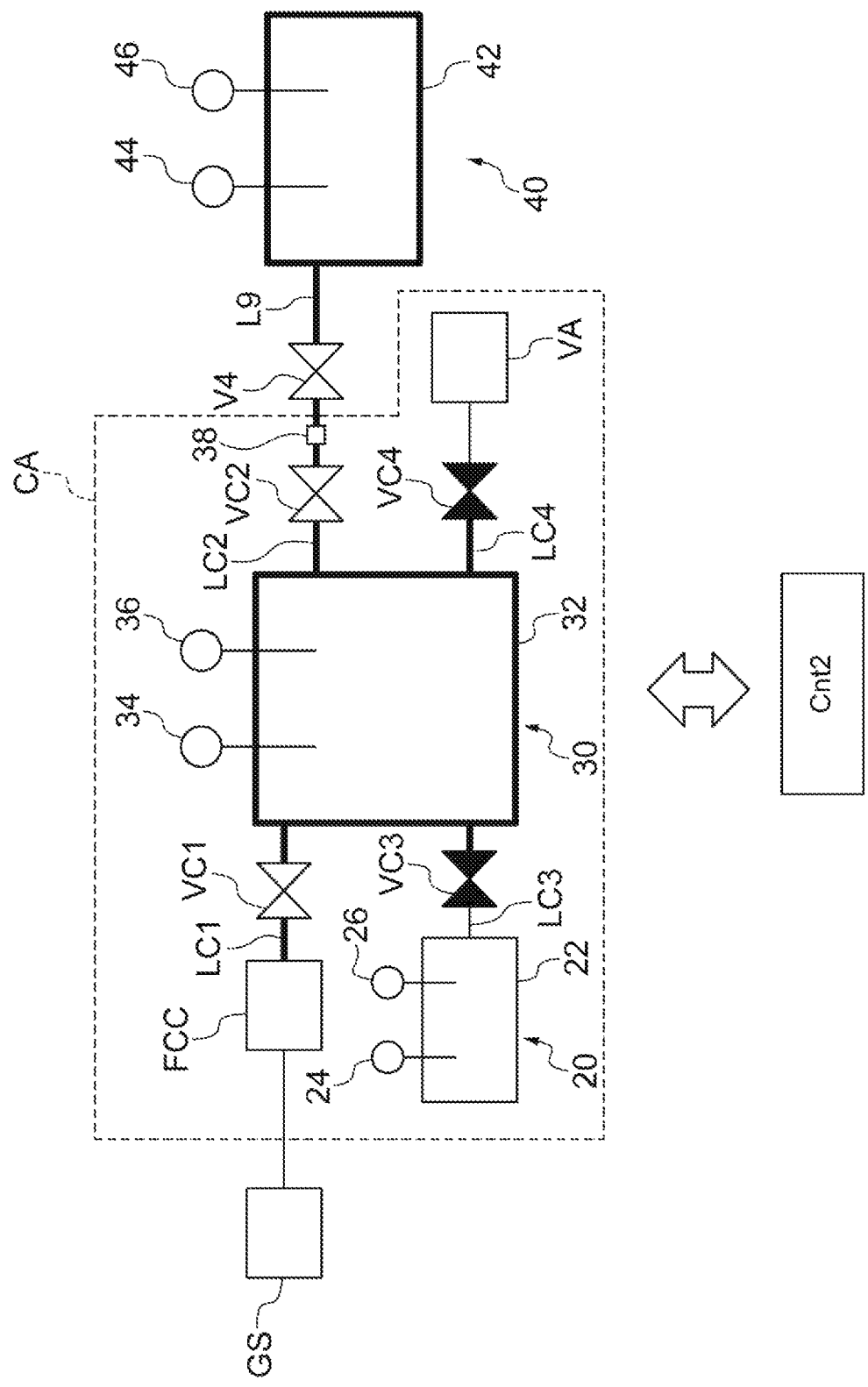

In step S24a, in a state where the valves VC1, VC2 and V4 are opened, and the valves VC3 and VC4 are closed, a gas is supplied from the flow controller FCC into the tank 32. FIG. 7 is a diagram schematically illustrating a state of each valve of the calibrator CA after the execution of step S24a. After the execution of step S24a, a gas is accumulated in the tanks 32 and 42 as shown by bold lined in FIG. 7.

Next, step S24b is performed. In step S24b, after the valve VC1 is closed, and then the gas supplied into the tank 32 and 42 is set to be in a stable state, the pressure gauge 44 and the thermometer 46 of the secondary reference device 40 are calibrated on the basis of the measured values of the pressure gauge 34 and the thermometer 36 of the primary reference device 30. This calibration is performed by adjusting the pressure gauge 44 and the thermometer 46 so that the measured values of the pressure gauge 44 and the thermometer 46 are coincident with the measured values of the pressure gauge 34 and the thermometer 36. This calibration can allow the secondary reference device 40 to be calibrated with high accuracy on the basis of the primary reference device 30 calibrated using the reference device for collation 20. After the execution of step S24, the valve VC4 is opened, and thus the gas in the tanks 32 and 42 may be exhausted using the exhaust apparatus VA.

After the execution of step S24, step S25 is performed. In step S25, the volume of a closed space including a space in the tank 42 (hereinafter, simply called "the volume of a closed space including a space in the tank 42") of the secondary reference device 40 when the valve VC2 is closed is calculated. The volume of a closed space including a space in the tank 42 is a total sum of the volume of the tank 42 when the valve VC2 is closed and the volume of a flow channel which is in communication with the tank 42. Specifically, in the exemplary embodiment shown in FIG. 4, in a case where the valve V4 is opened, the sum of the volume of the tank 42, the volume of the piping L9, and a partial volume between the valve VC2 and the joint 38 out of the total volume of the pipe LC2 is set to the volume of a closed space including a space in the tank 42. Meanwhile, the partial volume between the valve VC2 and the joint 38 out of the total volume of the pipe LC2 may be configured to be the same as the volume of the piping L10 of the gas supply system 10.

Step S25 includes step S25a, step S25b, step S25c, step S25d, and step S25e.

Figure 8:
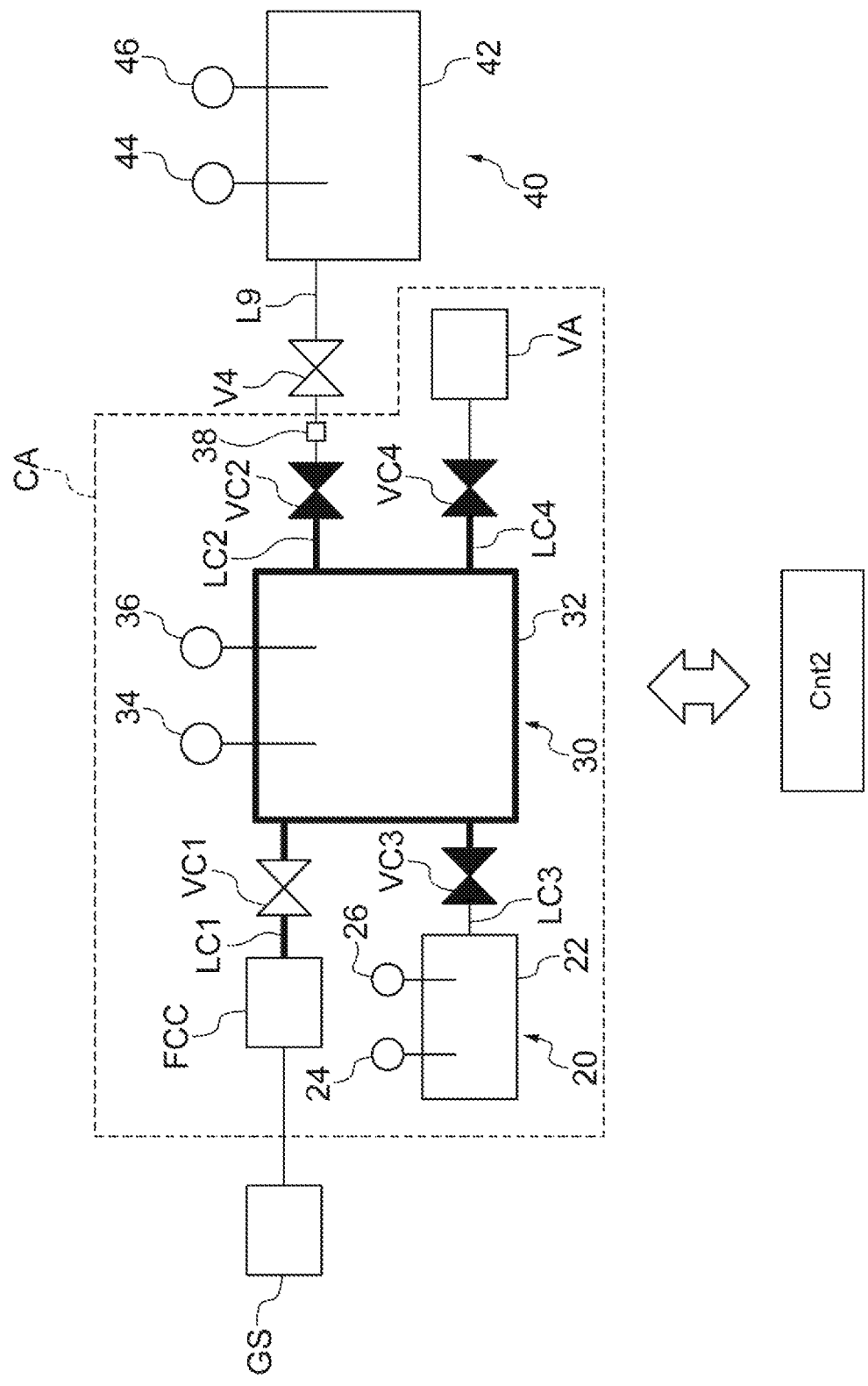

In step S25, step S25a is first performed. In step S25a, in a state where the valves VC1 and V4 are opened, and the valves VC2, VC3 and VC4 are closed, a gas is supplied from the flow controller FCC into the tank 32 of the primary reference device 30. FIG. 8 is a diagram schematically illustrating a state of each valve of the calibrator CA after the execution of step S25a. After the execution of step S25a, as shown by bold lines in FIG. 8, a gas is accumulated inside the tank 32, the pipe LC1, a portion of the pipe LC2 located between the valve VC2 and the tank 32, a portion of the pipe LC3 located between the valve VC3 and the tank 32, and a portion of the pipe LC4 located between the valve VC4 and the tank 32.

After the execution of step S25a, step S25b is performed. In step S25b, after the valve VC1 opened in step S25a is closed, and then the gas in the tank 32 is set to be in a stable state, the measured values of the pressure gauge 34 and the thermometer 36, that is, the pressure and temperature of the gas in the tank 32 are acquired.

Figure 9:
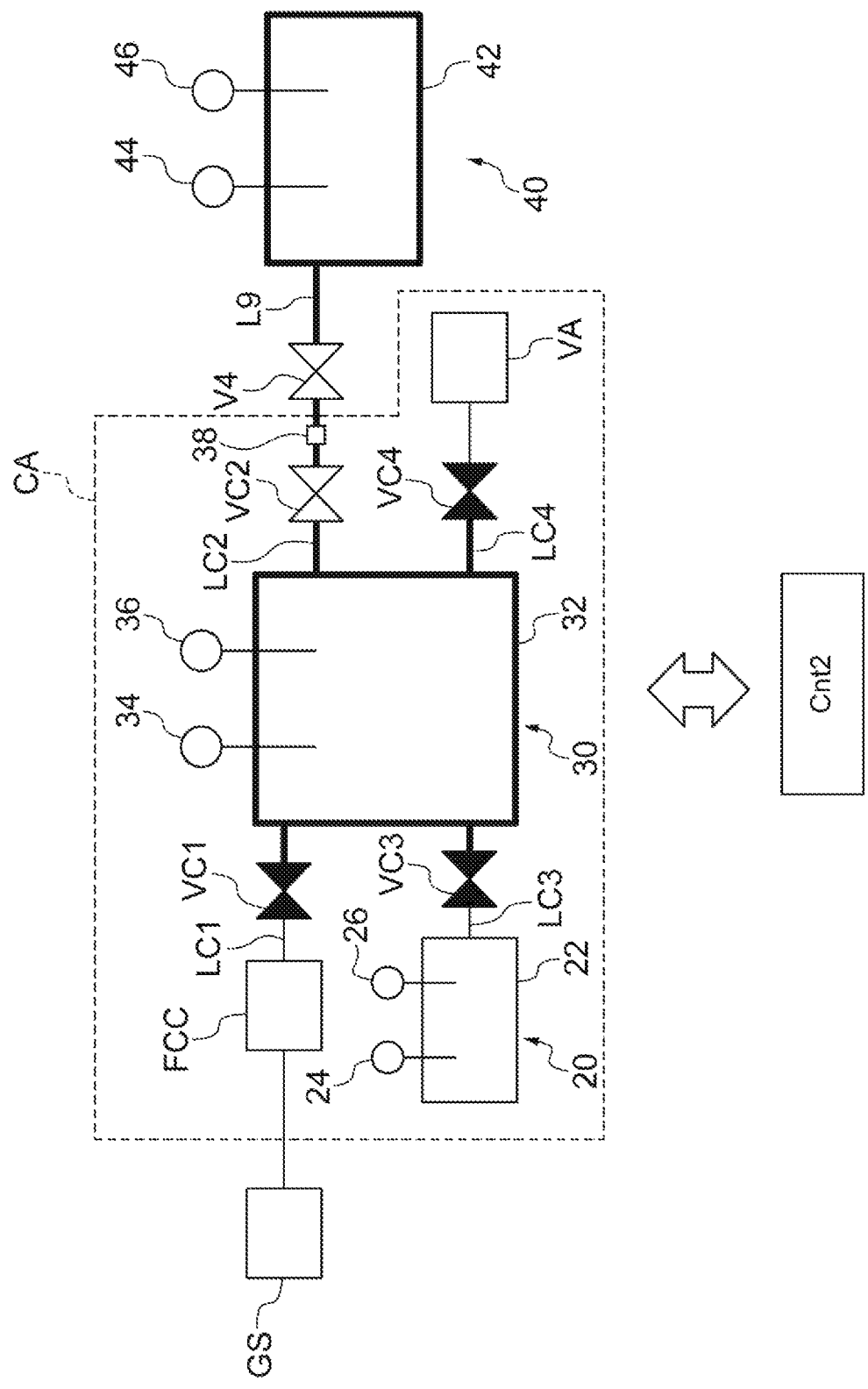
FIG. 9 is a diagram schematically illustrating a state of each valve of the calibrator after the execution of step S25c.

After the execution of step S25b, step S25c is performed. In step S25c, the valve VC2 is opened, and thus a portion of the gas in the tank 32 is supplied into the tank 42. FIG. 9 is a diagram schematically illustrating a state of each valve of the calibrator CA after the execution of step S25c. As shown in FIG. 9, after the execution of step S25c, as shown by bold lines in FIG. 9, a gas is accumulated inside the tank 32, the tank 42, a portion of the pipe LC1 located between the valve VC1 and the tank 32, the pipe LC2, a portion of the pipe LC3 located between the valve VC3 and the tank 32, a portion of the pipe LC4 located between the valve VC4 and the tank 32, and the piping L9.

After the execution of step S25c, step S25d is performed. In step S25d, after the gas in the tank 32 and the tank 42 is set to be in a stable state, the measured values of the pressure gauge 34 and the thermometer 36, that is, the pressure and temperature of the gas in the tank 32 are acquired again. Meanwhile, in step S25d, the measured values of the pressure gauge 44 and the thermometer 46, that is, the pressure and temperature of the gas in the tank 42 may be acquired instead of the acquisition of the pressure and temperature of the gas in the tank 32.

After the execution of step S25d, step S25e is performed. In step S25e, the volume of a closed space including a space in the tank 42 of the secondary reference device 40 is calculated. Here, when the pressure of the gas is set to P, the temperature of the gas is set to T, and the volume of the gas is set to V, PV/T has a constant property (Boyle-Charles' law). Therefore, when the pressure and temperature in the tank 32 measured in step S25b are set to $P_1$ and $T_1$, respectively, and the pressure and temperature in the tank 32 measured in step S25d are set to $P_2$ and $T_2$, respectively, these measured values have a relation of the following Expression (4). Here, in the following Expression (4), $V_{32}$ represents the volume of a closed space including a space in the tank 32, and $V_{42}$ represents the volume of a closed space including a space in the tank 42.

$$P_1 \cdot V_{32}/T_1 = P_2 \cdot (V_{32}+V_{42})/T_2 \quad (4)$$

In step S25e, the volume $V_{32}$ of a closed space including a space in the tank 32, the pressure $P_1$ and temperature $T_1$ in the tank 32 measured in step S25b, and the pressure $P_2$ and temperature $T_2$ in the tank 32 or 42 measured in step S25d are substituted into Expression (4), and thus the volume $V_{42}$ of a closed space including a space in the tank 42 is calculated. After the execution of step S25, the secondary reference device 40 may be detached from the calibrator CA. As described above, in the method MT2, the pressure gauge 44 and the thermometer 46 of the secondary reference device 40 are calibrated, and the volume of a closed space including a space in the tank 42 is calculated.

Reference is made to FIGS. 1 and 2 again to describe the method MT1 of inspecting a gas supply system of an exemplary embodiment. Hereinafter, the method MT1 will be described by taking an example of a case where the flow controller FC1 out of the plurality of flow controllers FC is a flow controller which is a target for inspection. In addition, hereinafter, it is assumed that when a gas is supplied from the flow controller FC1, a valve connected to the flow controller FC1 out of the plurality of valves V5 is opened, and that the other plurality of valves V5 and the other plurality of valves V6 are closed. Further, when a gas is not supplied from the flow controller FC1, it is assumed that the plurality of valves V5 and the plurality of valves V6 are all closed.

In the method MT1 shown in FIG. 1, after the secondary reference device 40 is calibrated in step S1, step S2 is performed. In step S2, the secondary reference device 40 calibrated in step S1 is connected to the piping 12 of the gas supply system 10. Specifically, the piping L9 of the secondary reference device 40 is connected to the joint 18, and thus the secondary reference device 40 is detachably connected to the other end of the connecting pipe L3 through the piping L10 and the valve V3.

After the execution of step S2, step S3 is performed. In step S3, the pressure gauge 14 and the thermometer 16 which are provided to the piping 12 are calibrated. Meanwhile, step S3 may be performed when the pressure gauge 14 and the thermometer 16 are used for the first time, or when a period which is set in advance from the previous calibration has elapsed, and may not necessarily be performed whenever the method MT1 is executed. Step S3 includes step S3a and step S3b. In step S3, step S3a is first performed.

Figure 10:
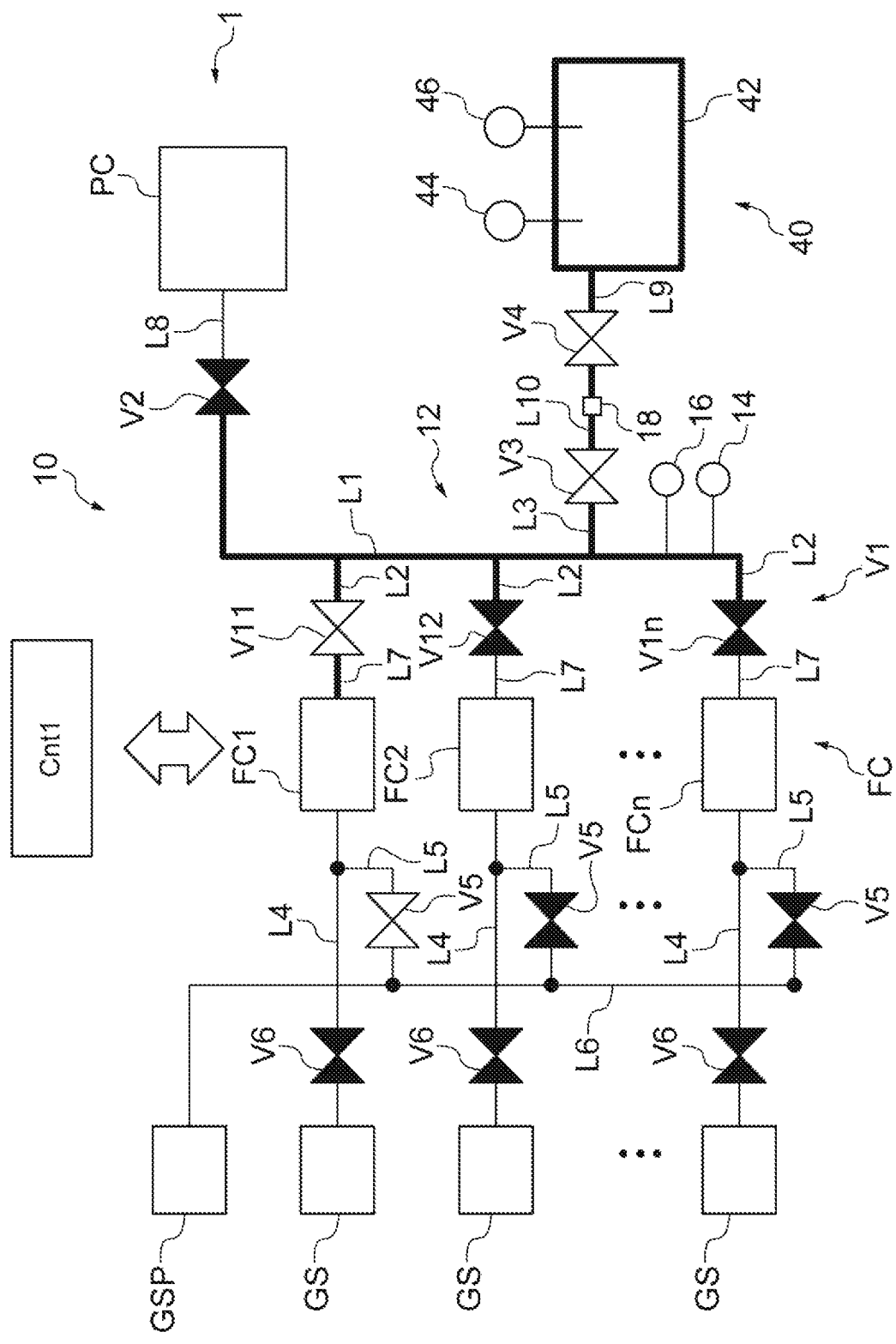

In step S3a, in a state where the valve V11, the valve V3 and the valve V4 are opened, and the valves V12 to V1n and the valve V2 are closed, a gas is supplied from the flow controller FC1 into the piping 12. FIG. 10 is a diagram schematically illustrating a state of each valve of the gas supply system 10 after the execution of step S3a. As shown in FIG. 10, after the execution of step S3a, as shown by bold lines in FIG. 10, a gas is accumulated in the piping 12, the piping L7, the piping L9, the piping L10, and the tank 42.

After the execution of step S3a, step S3b is performed. In step S3b, after the valve V11 opened in step S3a is closed, and then the gas in the piping 12 and the tank 42 is set to be in a stable state, the pressure gauge 14 and the thermometer 16 of the piping 12 are calibrated on the basis of the measured values of the pressure gauge 44 and the thermometer 46. This calibration is performed by adjusting the pressure gauge 14 and the thermometer 16 so that the measured values of the pressure gauge 14 and the thermometer 16 are coincident with the measured values of the pressure gauge 44 and the thermometer 46. After the execution of step S3b, the valve V2 is opened, and thus the inside of the piping 12 may be exhausted using the exhaust apparatus of the substrate processing apparatus 1.

After the execution of step S3, step S4 is performed. In step S4, the volume of the piping 12 is calculated. Step S4 includes step S4a, step S4b, step S4c, step S4d, and step S4e. In step S4, step S4a is first performed.

Figure 11:
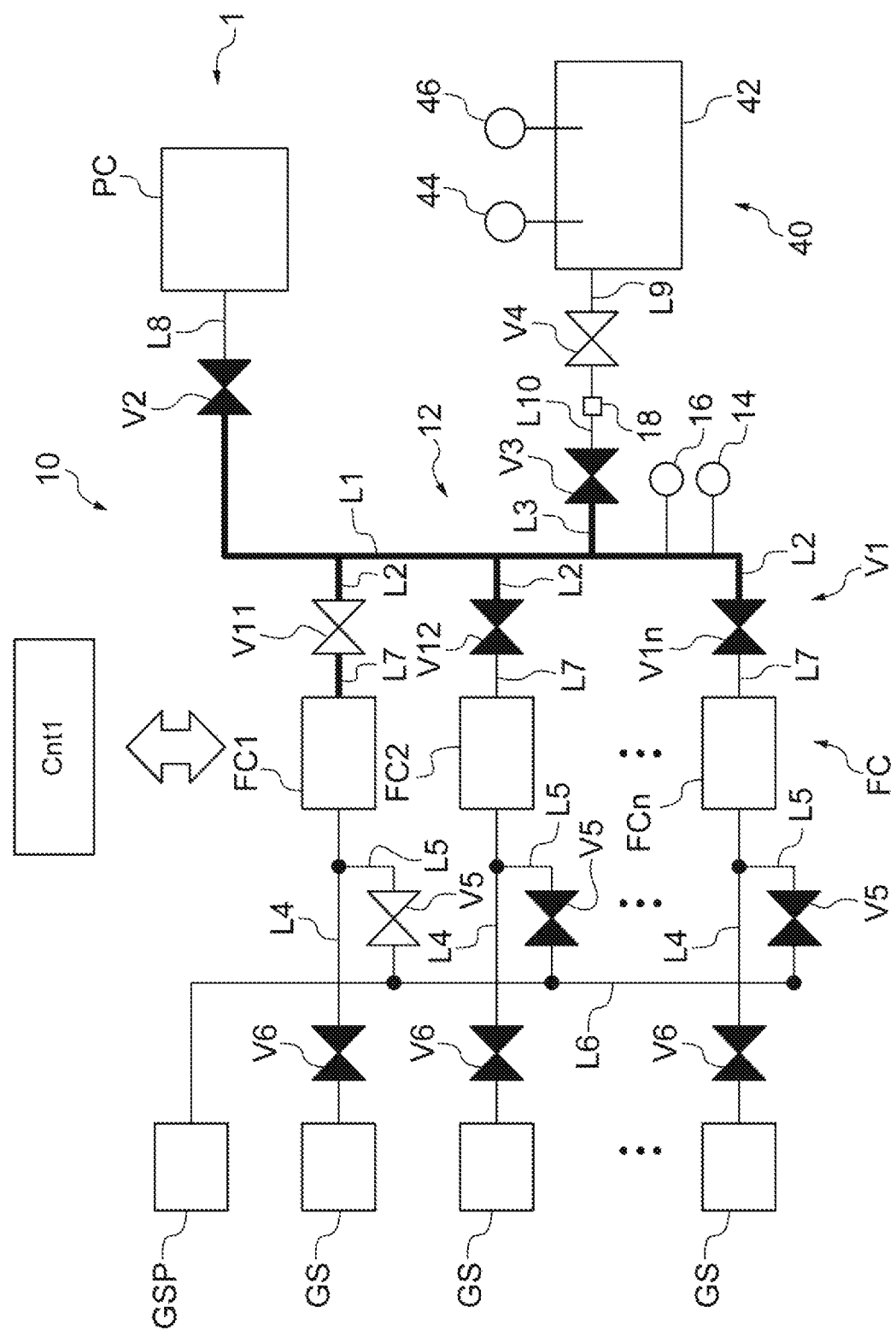

In step S4a, in a state where the valves V11 and V4 are opened, and the valves V12 to V1n and the valves V2 and V3 are closed, a gas is supplied from the flow controller FC1 into the piping 12. FIG. 11 is a diagram schematically illustrating a state of each valve of the gas supply system 10 after the execution of step S4a. As shown in FIG. 11, after the execution of step S4a, as shown by bold lines in FIG. 11, a gas is accumulated in the piping L7 and the piping 12.

After the execution of step S4a, step S4b is performed. In step S4b, after the valve V11 opened in step S4a is closed, and then the gas in the piping 12 is set to be in a stable state, the measured values of the pressure gauge 14 and the thermometer 16, that is, the pressure and temperature of the gas in the piping 12 are acquired.

Figure 12:
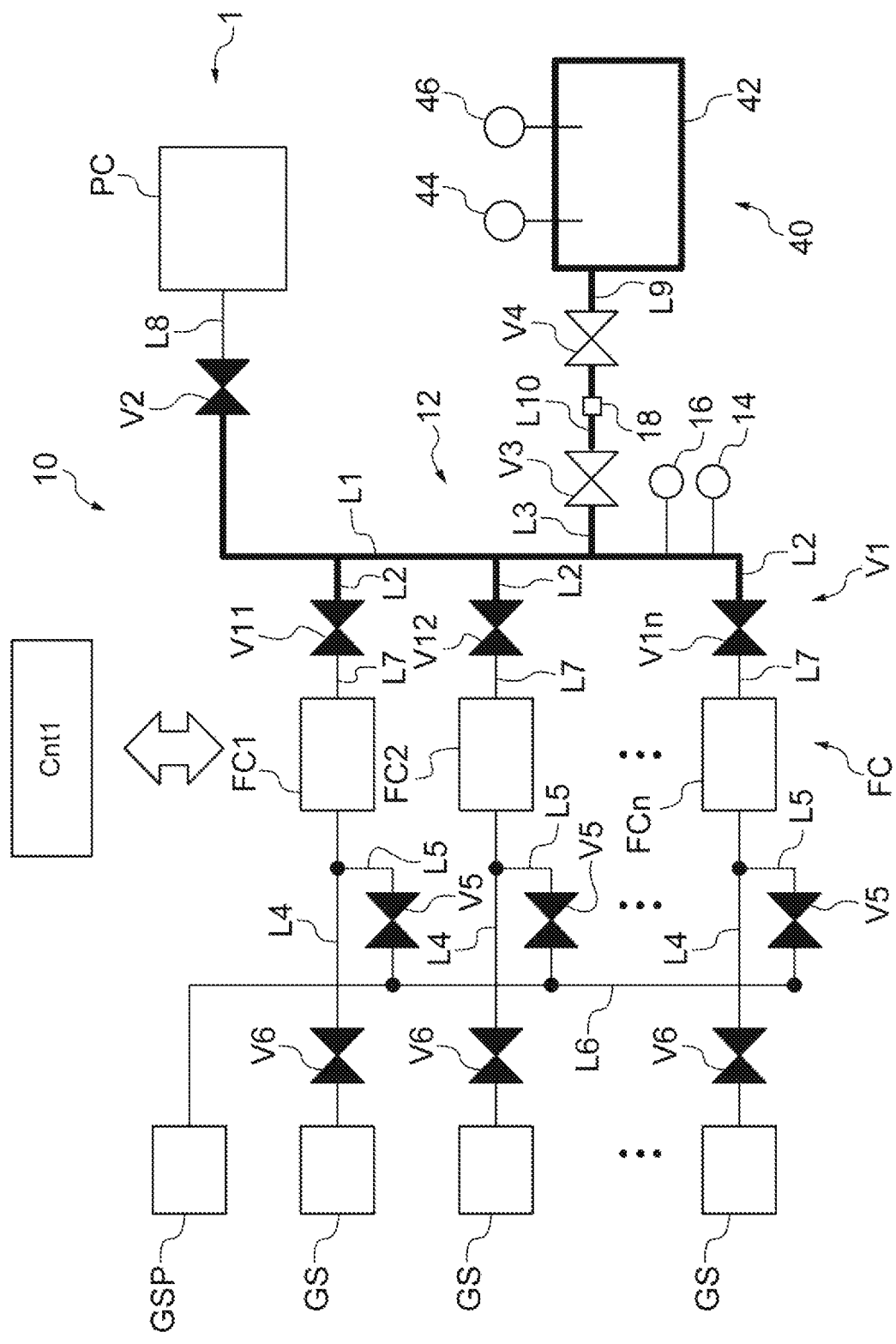
FIG. 12 is a diagram schematically illustrating a state of each valve of the gas supply system after the execution of step S4c.

After the execution of step S4b, step S4c is performed. In step S4c, the valve V3 is opened, and thus a portion of the gas in the piping 12 is supplied into the tank 42. FIG. 12 is a diagram schematically illustrating a state of each valve of the gas supply system 10 after the execution of step S4c. As shown in FIG. 12, after the execution of step S4c, as shown by bold lines in FIG. 12, a gas is accumulated in the piping 12, the piping L10, the piping L9, and the tank 42.

After the execution of step S4c, step S4d is performed. In step S4d, after the gas in the piping 12 and the tank 42 is set to be in a stable state, the measured values of the pressure gauge 14 and the thermometer 16, that is, the pressure and temperature of the gas in the piping 12 are acquired. Meanwhile, in step S4d, the measured values of the pressure gauge 44 and the thermometer 46, that is, the pressure and temperature of the gas in the tank 42 may be acquired instead of the acquisition of the measured values of the pressure gauge 14 and the thermometer 16.

After the execution of step S4d, step S4e is performed. In step S4e, the volume of the piping 12 is calculated. Here, when the pressure and temperature in the piping 12 measured in step S4b are set to $P_1$ and $T_1$, respectively, and the pressure and temperature in the piping 12 measured in step S4d are set to $P_2$ and $T_2$, respectively, these measured values have a relation of the following Expression (5), from the above-described Boyle-Charles' law. Here, in the following Expression (5), $V_{12}$ represents the volume of the piping 12, and $V_{42}$ represents the volume of a closed space including a space in the tank 42.

$$P_1 \cdot V_{12}/T_1 = P_2 \cdot (V_{12}+V_{42})/T_2 \qquad (5)$$

In step S4e, the volume $V_{42}$ of a closed space including a space in the tank 42 calculated in step S25 of the method MT2, the pressure $P_1$ and temperature $T_1$ in the piping 12 measured in step S4b, and the pressure $P_2$ and temperature $T_2$ in the piping 12 or the tank 42 measured in step S4d are substituted into Expression (5), and thus the volume $V_{12}$ of the piping 12 is calculated. Meanwhile, after the execution of step S4, the secondary reference device 40 may be detached from the gas supply system 10. In addition, after the execution of step S4, the valve V2 is opened, and thus the inside of the piping 12 may be exhausted using the exhaust apparatus of the substrate processing apparatus 1.

After the execution of step S4, step S5 is performed. In step S5, the flow rate of a gas flowing in the piping 12 is calculated using a so-called build-up method. Step S5 includes step S5a, step S5b and step S5c. In step S5, step S5a is first performed.

Figure 13:
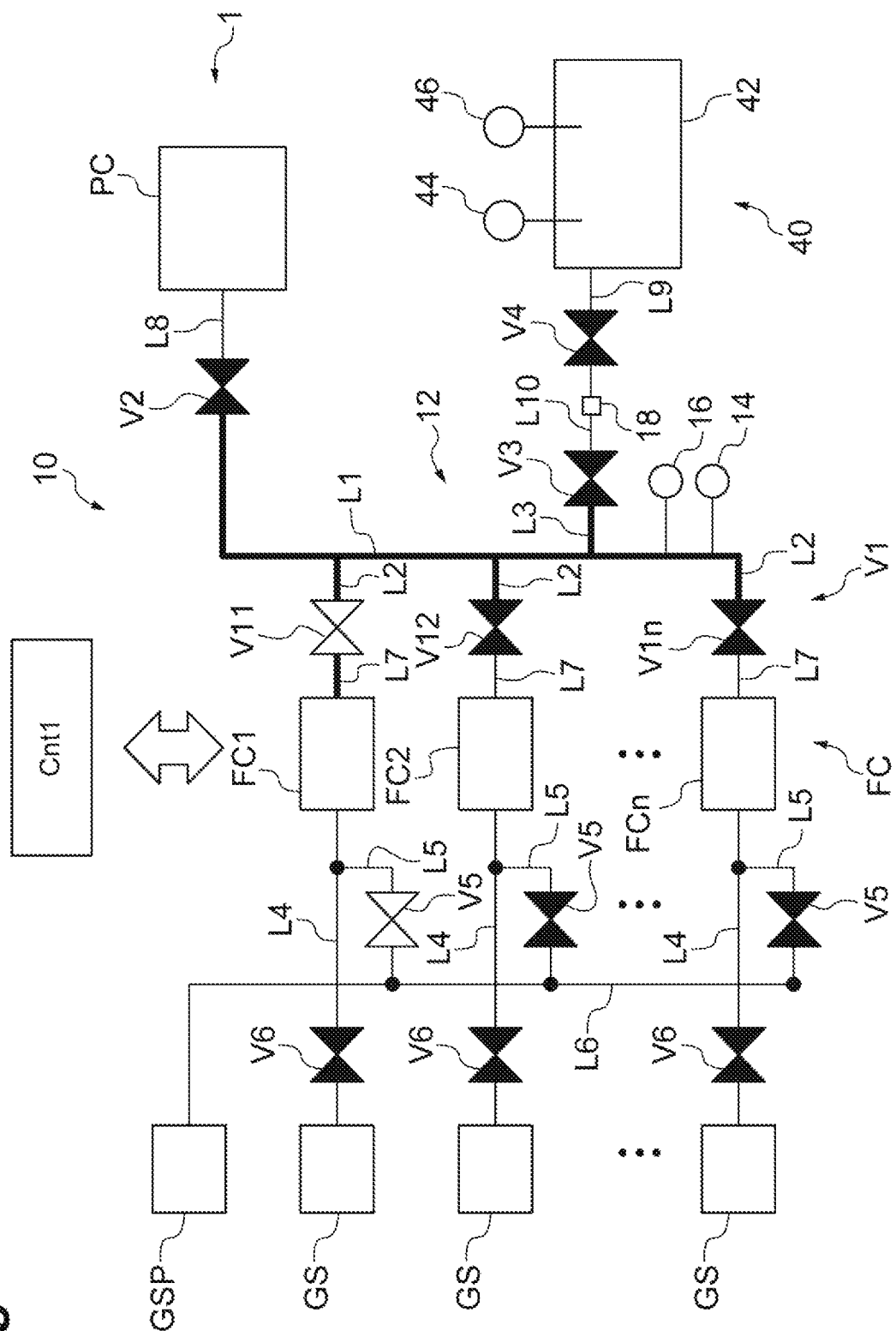

In step S5a, in a state where the valves V11 and V2 are opened, and the valves V12 to V1n and the valves V3 and V4 are closed, a gas is supplied from the flow controller FC1 into the piping 12 at a constant set flow rate. Thereafter, the valve V2 is closed. FIG. 13 is a diagram schematically illustrating a state of each valve of the gas supply system 10 after the execution of step S5a. After the execution of step S5a, as shown by bold lines in FIG. 13, a gas is accumulated in the piping L7 and the piping 12.

After the execution of step S5a, step S5b is performed. In step S5b, in a state where a gas is continuously supplied from the flow controller FC1 into the piping 12 at a constant set flow rate, the measured values of the pressure gauge 14 and the thermometer 16, that is, the pressure and temperature in the piping 12 are acquired. The measurement of the pressure and temperature in the piping 12 is performed at least twice. In an exemplary embodiment, the first measurement is performed at a first point in time $t_1$ when the valve V2 is closed, and the second measurement is performed at a second point in time $t_2$ after a time $\Delta t$ from the first point in time $t_1$.

After the execution of step S5b, step S5c is performed. In step S5c, the actual flow rate of a gas in the piping 12 is calculated from the measurement result in step S5b. Specifically, in step S5c, a difference $\Delta P$ between a pressure value in the piping 12 measured at the first point in time $t_1$ and a pressure value in the piping 12 measured at the second point in time $t_2$ is divided by the time $\Delta t(=t_2-t_1)$ from the first point in time $t_1$ to the second point in time $t_2$, and thus the pressure increasing rate $\Delta P/\Delta t$ in the piping 12 with respect to the time $\Delta t$ is calculated. Next, the pressure increasing rate $\Delta P/\Delta t$, the volume $V_{12}$ of the piping 12 calculated in step S4, the volume $V_{L7}$ of the piping L7, and the temperature T of the gas measured at the first point in time $t_1$ or the second point in time $t_2$ are substituted into the following Expression (6), and thus the actual flow rate Q of the gas in the piping 12 is calculated. Meanwhile, the volume $V_{L7}$ of the piping L7 is a known value which is determined during the design of the gas supply system 10.

$$Q=(\Delta P/\Delta t) \cdot (V_{12}+V_{L7}) \cdot C/T \qquad (6)$$

Here, in a case where the sum of the volume of the piping 12 when the valve V11 is opened and the valves V12 to V1n, the valve V2, and the valve V3 and V4 are closed and the volume of a flow channel which is in communication with the piping 12, that is, the sum of the volume $V_{12}$ of the piping 12 and the volume $V_{L7}$ of the piping L7 are set to $V_p$, the actual flow rate Q of the gas in the piping 12 is represented like the following Expression (1-1).

$$Q=(\Delta P/\Delta t) \cdot V_p \cdot C/T \qquad (1-1)$$

After the execution of step S5c, the valve V2 is opened, and thus the inside of the piping 12 may be exhausted using the exhaust apparatus of the substrate processing apparatus 1.

In the method MT1, after the execution of step S5, step S6 may be performed. In step S6, the output flow rate of the flow controller FC1 is calibrated on the basis of the actual flow rate Q of the gas calculated in step S5. The calibration of the flow controller FC1 is performed by adjusting the flow controller FC1 so that the set flow rate of the flow controller FC1 and the actual flow rate Q of the gas calculated in step S5 are coincident with each other. After the execution of step S6, the valve V2 is opened, and thus the inside of the piping 12 may be exhausted using the exhaust apparatus of the substrate processing apparatus 1.

According to the above-described method MT1, it is possible to calculate the volume of the piping 12, with high accuracy, using the Boyle-Charles' law without using the flow rate value of a flow controller having low reliability. In addition, it is possible to accurately obtain the flow rate of the gas in the piping 12 by using the calculated volume of the piping 12.

In addition, according to the above-described method MT2, it is possible to calibrate the secondary reference device 40 on the basis of the primary reference device 30. Since the secondary reference device 40 can be detached, a plurality of secondary reference devices 40 are connected to the calibrator CA in order, and the method MT2 is applied, thereby allowing the plurality of secondary reference devices 40 calibrated by the common calibrator CA to be provided. For example, the plurality of secondary reference devices 40 calibrated in this manner are used in a plurality of factories which are geographically separated from each other, and thus the gas supply system of the substrate processing apparatus disposed in different factories can be inspected on the basis of a common standard.

As described above, the method of inspecting a gas supply system, the method of calibrating a flow controller, and the method of calibrating a secondary reference device according to an exemplary embodiment have been described, but various modifications may be made without being limited to the above-described embodiments. In the exemplary embodiment, the exemplary embodiment has been described in which one flow controller FC1 out of the plurality of flow controllers FC is calibrated. However, in an exemplary embodiment, the other flow controllers FC2 to FCn may be calibrated in order using the method MT1. In addition, the calibrator CA may not necessarily include the reference device for collation 20, the exhaust apparatus VA, the pipe LC3, the pipe LC4, the valve VC3, and the valve VC4.

From the foregoing description, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method of calibrating a flow controller of a gas supply system using a calibrator and a secondary reference device, wherein the gas supply system comprises:
   a plurality of flow controllers respectively connected to a plurality of gas sources,
   a piping including a main pipe having an end on a downstream side connected to the processing container of a substrate processing apparatus, a plurality of branch pipes branching from the main pipe and respectively connected to the plurality of flow controllers, and a connecting pipe having one end connected to a midway position of the main pipe or a midway position of one branch pipe out of the plurality of branch pipes and the other end,
   a plurality of first valves respectively provided between the plurality of branch pipes and the plurality of flow controllers,
   a second valve provided between the end of the main pipe on the downstream side and the processing container,
   a third valve provided to the other end of the connecting pipe,
   a first pressure gauge configured to measure a pressure in the piping, and
   a first thermometer configured to measure a temperature in the piping,
   wherein the calibrator comprises:
      a flow controller connected to a gas source,
      a primary reference device including a first tank, a second pressure gauge configured to measure a pressure in the first tank, and a second thermometer configured to measure a temperature in the first tank,
      a first pipe that connects the flow controller of the calibrator and the first tank,
      a second pipe having one end and an other end, the one end of the second pipe being connected to the first tank,
      a fourth valve provided on a path of the first pipe, and
      a fifth valve provided on a path of the second pipe,
   the method comprising:
      a first step of detachably connecting the secondary reference device to the other end of the second pipe, the secondary reference device comprising a second tank, a third pressure gauge configured to measure a pressure in the second tank, and a third thermometer configured to measure a temperature in the second tank;
      a second step of supplying a gas from the flow controller of the calibrator into the first tank and the second tank, in a state where the fourth valve and the fifth valve are opened;
      a third step of calibrating the third pressure gauge and the third thermometer, on the basis of measured values of the second pressure gauge and the second thermometer, after the second step and after the fourth valve is closed;
      a fourth step of supplying a gas from the flow controller of the calibrator into the first tank, in a state where the fourth valve is opened and the fifth valve is closed, after the third step;
      a fifth step of acquiring measured values of the second pressure gauge and the second thermometer, after the fourth step and after the fourth valve is closed;
      a sixth step of supplying a portion of the gas in the first tank into the second tank by opening the fifth valve, after the fifth step;
      a seventh step of acquiring measured values of the second pressure gauge and the second thermometer or measured values of the third pressure gauge and the third thermometer, after the sixth step;
      an eighth step of using a Boyle-Charles' law to calculate a volume of a closed space including a space in the second tank when the fifth valve is closed, on the basis of the measured values acquired in the fifth step, the measured values acquired in the seventh step, and a volume of a closed space including a space in the first tank when the fourth valve and the fifth valve are closed;
      a ninth step of connecting the secondary reference device to the other end of the connecting pipe through the third valve, after the eight step;
      a tenth step of supplying a gas from one flow controller out of the plurality of flow controllers, connected to one first valve out of the plurality of first valves, into the piping, in a state where the one first valve is opened and the other first valve except the one first valve out of the plurality of first valves, the second valve and the third valve are closed;
      an eleventh step of acquiring measured values of the first pressure gauge and the first thermometer, after the tenth step and after the one first valve is closed;
      a twelfth step of supplying a portion of the gas in the piping into the second tank by opening the third valve, after the eleventh step;
      a thirteenth step of acquiring measured values of the first pressure gauge and the first thermometer or measured values of the third pressure gauge and the third thermometer, after the twelfth step;
      a fourteenth step of using a Boyle-Charles' law to calculate a volume of the piping on the basis of the measured values acquired in the eleventh step, the measured values acquired in the thirteenth step, and a volume of a closed space including a space in the second tank when the third valve is closed;

a fifteenth step of continuously supplying a gas from the one flow controller into the piping at a constant set flow rate, in a state where the one first valve is opened, and the other first valve, the second valve and the third valve are closed, after the fourteenth step;

a sixteenth step of measuring pressure and temperature in the piping at a first point in time and pressure and temperature in the piping at a second point in time after the first point in time, in a state where a gas is continuously supplied into the piping at the constant set flow rate, and calculating a pressure increasing rate in the piping from the first point in time to the second point in time;

a seventeenth step of calculating a flow rate Q of a gas in the piping from the following Expression (1-1), $$Q=(\Delta P/\Delta t)\cdot V_p\cdot C/T \tag{1-1}$$

wherein $\Delta P/\Delta t$ is the pressure increasing rate, $V_p$ is a sum of a volume of the piping and a volume of a flow channel communicating with the piping when the one first valve is opened, and the other first valve, the second valve and the third valve are closed, T is a temperature in the piping, and C is a constant; and an eighteenth step of calibrating an output flow rate of the one flow controller on the basis of the flow rate Q of a gas calculated in the seventeenth step and the constant set flow rate.

2. The method of calibrating a flow controller according to claim 1, further comprising, after the ninth step and before the tenth step:

a nineteenth step of supplying a gas from the one flow controller into the piping, in a state where the one first valve and the third valve are opened, and the other first valve and the second valve are closed; and a twentieth step of calibrating the first pressure gauge and the first thermometer, on the basis of the measured values of the third pressure gauge and the third thermometer, after the nineteenth step and after the one first valve is closed.

3. The method of calibrating a flow controller according to claim 1, wherein the calibrator includes a reference device for collation comprising a third tank, a fourth pressure gauge configured to measure a pressure in the third tank, and a fourth thermometer configured to measure a temperature in the third tank, a third pipe connecting the first tank and the third tank, and a sixth valve provided on a path of the third pipe, the method further comprising, before the first step:

a twenty-first step of supplying a gas from the flow controller of the calibrator into the first tank and the third tank, in a state where the fourth valve and the sixth valve are opened, and the fifth valve is closed; and a twenty-second step of calibrating the second pressure gauge and the second thermometer, on the basis of measured values of the fourth pressure gauge and the fourth thermometer, after the twenty-first step and after the fourth valve is closed.

4. The method of calibrating a flow controller according to claim 3, further comprising, after the twenty-second step and before the first step:

a twenty-third step of continuously supplying a gas from the flow controller of the calibrator into the first tank at a constant set flow rate, in a state where the fourth valve is opened, and the fifth valve and the sixth valve are closed;

a twenty-fourth step of measuring pressure and temperature in the first tank at a first point in time and pressure and temperature in the first tank at a second point in time after the first point in time, in a state where a gas is continuously supplied into the first tank at the constant set flow rate, and calculating a pressure increasing rate in the first tank from the first point in time to the second point in time; and a twenty-fifth step of calculating a volume V of a closed space including a space in the first tank when the fourth valve, the fifth valve and the sixth valve are closed, on the basis of the following Expression (1-2), $$V=Q\cdot T/\{(\Delta P/\Delta t)\cdot C\} \tag{1-2}$$

wherein $\Delta P/\Delta t$ is the pressure increasing rate, Q is the constant set flow rate, T is a temperature in the first tank, and C is a constant.

5. The method of calibrating a flow controller according to claim 1, further comprising a step of sequentially connecting a plurality of secondary reference devices having the same structure as the secondary reference device to the other end of the second pipe and sequentially calibrating the plurality of secondary reference devices by performing the second step, the third step, the fourth step, the fifth step, the sixth step, the seventh step, and the eighth step.

* * * * *